(12) United States Patent
La Delfa et al.

(10) Patent No.: US 12,163,024 B2
(45) Date of Patent: Dec. 10, 2024

(54) COMPOSITIONS WITH IMPROVED CHARACTERISTICS

(71) Applicant: ARXADA AG, Visp (CH)

(72) Inventors: Gaetano La Delfa, Naters (CH); Stefan Ellinger, Visp (CH); Roger Mazotti, Visp (CH); Magnus Abgottspon, Staldenried (CH); Viktor Dick, Basel (CH)

(73) Assignee: ARXADA AG, Visp (CH)

( * ) Notice: Subject to any disclaimer, the term of this patent is extended or adjusted under 35 U.S.C. 154(b) by 0 days.

(21) Appl. No.: 18/011,559

(22) PCT Filed: Jun. 24, 2021

(86) PCT No.: PCT/EP2021/067370
§ 371 (c)(1),
(2) Date: Dec. 20, 2022

(87) PCT Pub. No.: WO2021/260124
PCT Pub. Date: Dec. 30, 2021

(65) Prior Publication Data
US 2023/0265287 A1    Aug. 24, 2023

(30) Foreign Application Priority Data

Jun. 24, 2020 (EP) .................................. 20182074
Sep. 24, 2020 (EP) .................................. 20198245
Feb. 26, 2021 (EP) .................................. 21159763

(51) Int. Cl.
*C08L 79/08* (2006.01)
*C08G 73/06* (2006.01)

(52) U.S. Cl.
CPC .......... *C08L 79/08* (2013.01); *C08G 73/0611* (2013.01)

(58) Field of Classification Search
CPC ........ C08L 79/08; C08L 79/085; C08L 73/00; C08L 101/025
See application file for complete search history.

(56) References Cited

U.S. PATENT DOCUMENTS

| | | | |
|---|---|---|---|
| 5,198,515 A | | 3/1993 | Van Swieten |
| 7,271,227 B1* | | 9/2007 | Attarwala ............... C08L 33/14 |
| | | | 526/299 |
| 2009/0186158 A1 | | 7/2009 | Eisenhuth |
| 2021/0214547 A1 | | 7/2021 | Honda et al. |
| 2021/0278767 A1 | | 9/2021 | Ueno et al. |

FOREIGN PATENT DOCUMENTS

| | | |
|---|---|---|
| EP | 2018401 | 1/2010 |
| JP | H06306165 | 11/1994 |
| JP | 2014019815 | 2/2014 |
| JP | 2015017158 | 1/2015 |
| JP | 2019089929 | 6/2019 |

OTHER PUBLICATIONS

International Preliminary Report on Patentability for PCT/EP2021/06737, Sep. 27, 2022, 6 pgs.
Galanti et al: "The synthesis of biscitraconimides and polybiscitraconimides", Joural of Polymer Science: Part A: Polymer Chemistry, vol. 19, No. 2, Feb. 1, 1981, pp. 451-475.
International Search Report and Written Opinion for PCT/EP2021/067370 dated Sep. 8, 2021, 15 pages.

* cited by examiner

*Primary Examiner* — Ana L. Woodward
(74) *Attorney, Agent, or Firm* — Dority & Manning, P.A.

(57) ABSTRACT

The present invention relates to novel compositions comprising cyanate ester resins and substituted bisimides (citraconimides, bisitaconimide, citraconimido-itaconimide, bisnadicimide, bistetrahydroimide and mixtures thereof) as defined in claim 1, and thermoset composite materials based on these compositions.

16 Claims, No Drawings

COMPOSITIONS WITH IMPROVED CHARACTERISTICS

RELATED APPLICATIONS

The present application is the National Stage entry of International Patent Application No. PCT/EP2021/067370 filed on Jun. 24, 2021, which is based on and claims priority to European Patent application No. 20182074.3, filed on Jun. 24, 2020, European Patent application Ser. No. 20/198, 245.1, filed on Sep. 24, 2020, and European Patent application No. 21159763.8, filed on Feb. 26, 2021, each of which is incorporated herein by reference.

The present invention relates to novel compositions comprising cyanate ester resins and substituted bisimides (citraconimides, bisitaconimide, citraconimido-itaconimide, bisnadicimide, bistetrahydroimide and mixtures thereof), and thermoset composite materials based on these compositions.

Thermoset composite matrices are typically based on polyesters, vinyl esters, epoxies, bismaleimides, cyanate esters, polyimides and phenolics.

CA2464339A1 U.S. Pat. Nos. 3,553,244, 3,755,402, 3,740,348 and 4,578,439 and EP1190184 EP1195764, U.S. Pat. No. 9,263,360, EP 327926 discloses cyanate ester composites that can be used in compression molding, printed wiring boards, prepreg resins, composite sheet and metal fol-clad-laminate plate.

US20120049106, U.S. Pat. No. 7,271,227B1, U.S. Pat. Nos. 5,198,515 and 4,568,733, RSC Adv., 2017, 7, 23149 discloses bismaleimide composites that can be used for making laminates and prepregs by curing the composition to a polymer.

US2009/0110938 A1 discloses a cyanate ester resin composition for a printed wiring board material containing a cyanate ester resin component A and/or an oligomer thereof, and at least one component B selected from the group consisting of an epoxy resin and an unsubstituted bismaleimide compound. These bismaleimides are less suitable for high-temperature applications due to their high mass loss at high temperatures in long-term stability tests (see table 2)

US2014199549 A1 discloses thermosetting resin composition for electronics packaging application device comprising a hydrophobic solid bismaleimide, a benzoxazine monomer and an epoxy anhydride or epoxy phenol novolac or epoxy cresol novolac-anhydride adduct. As mentioned in the examples the bismaleimides are less suitable for high-temperature applications due to their high mass loss at high temperatures. Further benzoxazines and cyanate esters are known to have different curing mechanisms which will lead to different network structure and performance.

However, many of the current thermoset composite based on bismaleimide compounds have limitations or disadvantages that restrict their use as thermosetting resins in high-temperature applications and use of easy processing.

Therefore, there remains a need for new thermoset composite materials that have improved properties.

The present invention therefore provides a composition comprising components (a) and (b) wherein component (a) is one or more cyanate esters independently selected from (i) a difunctional cyanate ester compound of formula (I)

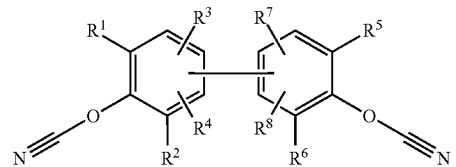

wherein $R^1$ through $R^8$ are independently selected from the group consisting of hydrogen, linear $C_{1-10}$ alkyl, halogenated linear $C_{1-10}$ alkyl, branched $C_{4-10}$ alkyl, halogenated branched $C_{4-10}$ alkyl, $C_{3-8}$ cycloalkyl, halogenated $C_{3-8}$ cycloalkyl, $C_{1-10}$ alkoxy, halogen, phenyl and phenoxy;

$Z^1$ indicates a direct bond or a divalent moiety selected from the group consisting of —O—, —S—, —S(=O)—, —S(=O)$_2$—, —CH$_2$—, —CH(CH$_3$)—, —C(CH$_3$)$_2$—, —CH(CF$_3$)—, —C(CF$_3$)$_2$—, —C(=O)—, —C(=CH$_2$)—, —C(=CCl$_2$)—, —Si(CH$_3$)$_2$—, linear $C_{1-10}$ alkanediyl, branched $C_{4-10}$ alkanediyl, $C_{3-8}$ cycloalkanediyl, 1,2-phenylene, 1,3-phenylene, 1,4-phenylene, —N($R^{13}$)— wherein $R^{13}$ is selected from the group consisting of hydrogen, linear $C_{1-10}$ alkyl, halogenated linear $C_{1-10}$ alkyl, branched $C_{4-10}$ alkyl, halogenated branched $C_{4-10}$ alkyl, $C_{3-8}$ cycloalkyl, phenyl and phenoxy, and moieties of formulas

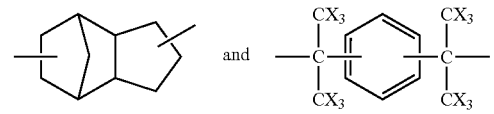

wherein X is independently selected from hydrogen and halogen; and oligomers, prepolymers, polymers or mixtures thereof;

and/or (ii) a polyfunctional cyanate ester of formula (II)

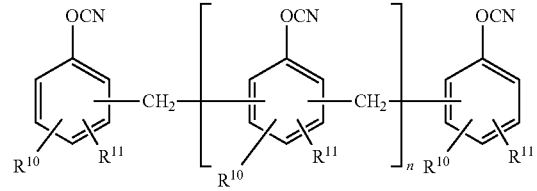

wherein n is an integer from 1 to 20; and $R^{10}$ and $R^{11}$ are identical or different and independently from each other selected from the group consisting of hydrogen, linear $C_{1-10}$ alkyl and branched $C_{4-10}$ alkyl; and oligomers, prepolymers, polymers or mixtures thereof;

and mixtures of cyanate esters of formula (I) and (II);

and wherein component (b) is one or more substituted bisimide compound independently selected from a compound of formula (X)

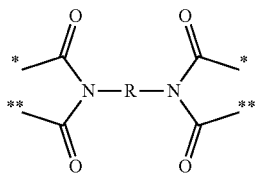

wherein * and ** each denotes a covalent bond to the respective C atom denoted with * and ** of a residue, wherein the residues are identical or different and independently selected from

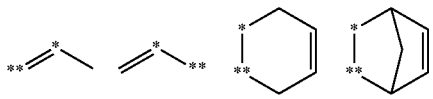

and wherein

R is independently selected from alkyl, cycloalkyl, alkyne, aryl, aralkyl and alkaryl; and, oligomers, prepolymers, polymers or mixtures of these compounds.

The term "halogen" refers to fluorine, chlorine, bromine or iodine, preferably fluorine, chlorine or bromine.

The term substituted bisimide refers to compounds with substitutions at the C≡C double bond (3 and/or 4 position) of the maleimide-group.

Alkyl substituents (either alone or as part of a larger group, such as alkoxy-) may be straight-chained or branched. Alkyl on its own or as part of another substituent is, depending upon the number of carbon atoms mentioned, for example, methyl, ethyl, n-propyl, n-butyl, n-pentyl, n-hexyl and the isomers thereof, for example, iso-propyl, iso-butyl, sec-butyl, tert-butyl or iso-amyl.

Alkenyl substituents (either alone or as part of a larger group, e.g. alkenyloxy) can be in the form of straight or branched chains, and the alkenyl moieties, where appropriate, can be of either the (E)- or (Z)-configuration.

Alkynyl substituents (either alone or as part of a larger group, e.g. alkynyloxy) can be in the form of straight or branched chains.

Aryl groups (either alone or as part of a larger group, such as e.g. aryloxy, aryl-alkyl) are aromatic ring systems which can be in mono-, bi- or tricyclic form. Examples of such rings include phenyl, naphthyl, anthracenyl, indenyl or phenanthrenyl. Preferred aryl groups are phenyl and naphthyl, phenyl being most preferred.

It has surprisingly been found that the thermoset composite compositions according to the invention may possess any number of benefits including, inter alia, improvements in processability compared to the individual components, improvements in the toughness, improvements in the thermal oxidative stability, increased safety profile, and/or improved physico-chemical properties of the resultant thermoset composite materials.

In particular, it has been found that the compositions according to the invention possess improved thermal-oxidative stabilities, as can be measured in terms of mass loss and surface damage of the resultant composite materials.

Further, the compositions according to the invention also demonstrate improvements in the glass transition temperature (Tg) of the resultant composite materials.

Moreover, the compositions according to the invention exhibit improvements in terms of processability of the materials, e.g. reduced viscosity, reduced void formation and reduction of shrinkage and distortion in the resultant composite materials, thereby reducing the need for long degassing steps and providing for reduced pressure during polymerisation.

It has been found that substituted bisimides improve the properties and/or the processability of the thermoset composite material.

In particular, it has been found that the thermoset composite materials based on substituted bisimides show improved thermal-oxidative stabilities, improved fracture toughness and decreased brittleness. Thermoset composite materials comprising resins cyanate ester resins and substituted bismimides have better handling, processing and thermal stability.

The biscitraconimides are 3-methyl analogues of bismaleimides. The biscitraconimide resins can be prepared by the general reaction between two equivalents of citraconic anhydride with a bisamine by elimination of water. In "The Synthesis of Bisitaconamic Acids and Isomeric Bisimide Monomers," Galanti, A. V. et al, Journ. Poly. Sci.: Polymer Chemistry Edition, Vol. 20, pp. 233-239 (1982) a method is disclosed for the preparation of biscitraconimides in the form of an isomeric mixture of the citraconic and itaconic imides.

A wide variety of cyanate esters are known to the skilled person including, but not limited to, Novolac cyanate ester (Primaset® PT resins from Lonza), 2,2-bis(4-cyanatophenyl)propane (known as Bisphenol-A dicyanate, available under trade name Primaset® BADCy, AroCy® B-10), bis (4-cyanato-3,5-dimethylpheny)methane (known as Bisphenol-F dicyanate, available under trade name Primaset® METHYLCy, AroCy® M-10), 1,1'-bis(4-cyanatophenyl) ethane (known as Bisphenol-E dicyanate, available under trade name Primaset® LeCy, AroCy® L-10), bis(4-cyanatophenyl)thioether (available under trade name AroCy® T-10), 3-bis(4-cyanatophenyl-1-(1-methylethylidene))benzene (known as Bisphenol-M dicyanate, available under trade name Primaset® LM-500, AroCy® XU366, RTX366), cyanated phenol-dicyclopentadiene adduct (available under trade name Primaset® DT-4000, AroCy®XU-71787.02L, XU71787), 1,3-phenylene-dicyanate (known as resorcinol dicyanate, available under trade name REX-370), fused ring cyanate monomers such as naphthalene and anthraquinone, fluoroaliphatic dicyanates, Primaset® ULL-950S, Primaset® HTL-300 and mixtures thereof.

Further cyanate esters to be used according to the invention are a. the reaction product of 2,2-bis(4-cyanatophenyl)propane (known as Bisphenol-A dicyanate, available under trade name Primaset® BADCy, AroCy© B-10) with hydroxyl-terminated polybutadiene (HTPB), which is an oligomer of butadiene terminated at each end with a hydroxyl functional group;

b. a rubber-modified cyanate ester by incorporating a cross-linked styrene-butadiene rubber copolymer and a styrene-acrylonitrile copolymer into a cyanated phenol-dicyclopentadiene adduct (Primaset® DT-4000, AroCy®XU-71787.02L, XU71787);

c. a cyanate ester prepolymer obtained by a prepolymerization reaction of Bisphenol-A dicyanate.

In one embodiment component (a) is one or more cyanate esters independently selected from (i) a difunctional cyanate ester compound of formula (I)

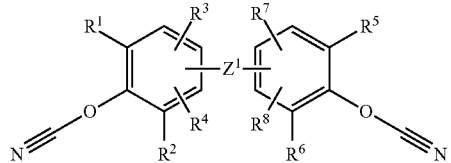

wherein $R^1$ through $R^8$ are independently selected from the group consisting of hydrogen, linear $C_{1-10}$ alkyl, $C_{3-8}$ cycloalkyl;

$Z^1$ indicates a direct bond or a divalent moiety selected from the group consisting of —O—, —S—, —S(=O)—, —S(=O)$_2$—, —CH$_2$—, —CH(CH$_3$)—, —C(CH$_3$)$_2$—, —CH(CF$_3$)—, —C(CF$_3$)$_2$—, —C(=O)—, —C(=CH$_2$)—, —C(=CCl$_2$)—, —Si(CH$_3$)$_2$—, linear $C_{1-10}$ alkanediyl, branched $C_{4-10}$ alkanediyl, $C_{3-8}$ cycloalkanediyl, 1,2-phenylene, 1,3-phenylene, 1,4-phenylene, —N($R^{13}$)— wherein $R^{13}$ is selected from the group consisting of hydrogen, linear $C_{1-10}$ alkyl, $C_{3-8}$ cycloalkyl, phenyl and phenoxy, and moieties of formulas

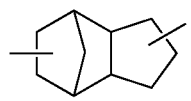 and 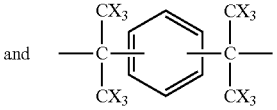

wherein X is independently selected from hydrogen and halogen; and oligomers, prepolymers, polymers or mixtures thereof;

and/or (ii) a polyfunctional cyanate ester of formula (II)

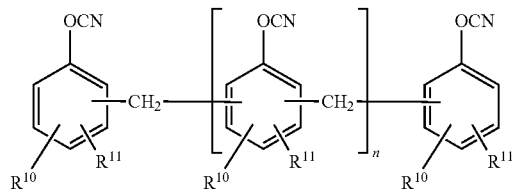

wherein n is an integer from 1 to 20; and $R^{10}$ and $R^{11}$ are identical or different and independently from each other selected from the group consisting of hydrogen, linear $C_{1-10}$ alkyl and branched $C_{4-10}$ alkyl; and oligomers, prepolymers, polymers or mixtures thereof, and mixtures of cyanate esters of formula (I) and (II).

In another embodiment component (a) is one or more cyanate esters independently selected from (i) a difunctional cyanate ester compound of formula (I)

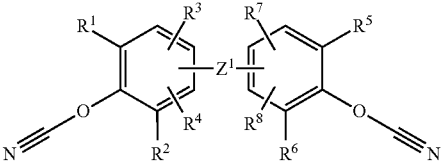

wherein $R^1$ through $R^8$ are independently selected from the group consisting of hydrogen, linear $C_{1-3}$ alkyl;

$Z^1$ indicates a direct bond or a divalent moiety selected from the group consisting of —O—, —S—, —S(=O)—, —S(=O)$_2$—, —CH$_2$—, —CH(CH$_3$)—, —C(CH$_3$)$_2$—, —CH(CF$_3$)—, —C(CF$_3$)$_2$—, —C(=CCl$_2$)—, —Si(CH$_3$)$_2$—, branched $C_{4-8}$ alkanediyl, $C_{3-8}$ cycloalkanediyl, 1,2-phenylene, 1,3-phenylene, 1,4-phenylene; and oligomers, prepolymers, polymers or mixtures thereof; and/or (ii) a polyfunctional cyanate ester of formula (II)

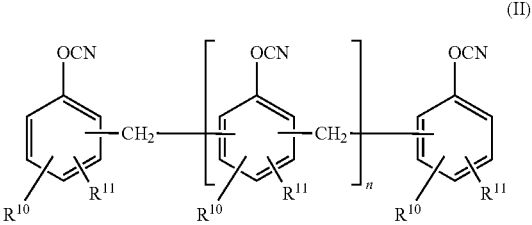

wherein n is an integer from 1 to 15; and $R^{10}$ and $R^{11}$ are identical or different and independently from each other selected from the group consisting of hydrogen, linear $C_{1-8}$ alkyl and branched $C_{4-8}$ alkyl; and oligomers, prepolymers, polymers or mixtures thereof, and mixtures of cyanate esters of formula (I) and (II).

In another embodiment component (a) is one or more cyanate esters independently selected from (i) a difunctional cyanate ester compound of formula (I)

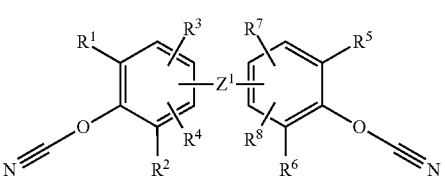

wherein $R^1$ through $R^8$ are independently selected from the group consisting of hydrogen, linear $C_{1-3}$ alkyl;

$Z^1$ indicates a direct bond or a divalent moiety selected from the group consisting of —O—, —S—, —S(=O)$_2$—, —CH$_2$—, —CH(CH$_3$)—, —C(CH$_3$)$_2$—, —C(CF$_3$)$_2$—, —C(=CCl$_2$)—, branched $C_{4-6}$ alkanediyl, $C_{3-8}$ cycloalkanediyl, 1,2-phenylene, 1,3-phenylene, 1,4-phenylene; and oligomers, prepolymers, polymers or mixtures thereof; and/or (ii) a polyfunctional cyanate ester of formula (II)

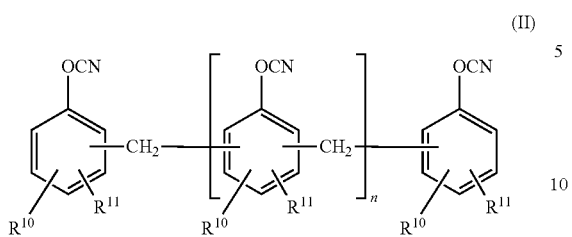

(II)

wherein
n is an integer from 1 to 10; and $R^{10}$ and $R^{11}$ are identical or different and independently from each other selected from the group consisting of hydrogen, linear $C_{1-5}$ alkyl and branched $C_{4-6}$ alkyl; and oligomers, prepolymers, polymers or mixtures thereof, and mixtures of cyanate esters of formula (I) and (II).

In another embodiment component (a) is one or more cyanate esters independently selected from
(i) a difunctional cyanate ester compound of formula (I)

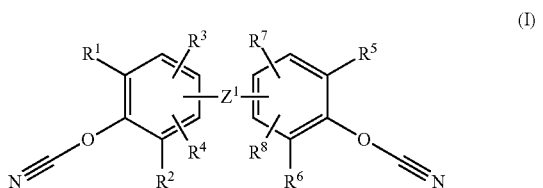

(I)

wherein the difunctional cyanate ester of formula I is independently selected from the group consisting of
 i) $R^1$, $R^2$, $R^5$ and $R^6$ are methyl, $R^3$, $R^4$, $R^7$ and $R^8$ are hydrogen and wherein $Z^1$ is —$CH_2$-(methylene) and oligomers, prepolymers, polymers or mixtures thereof, or
 ii) $R^1$ through $R^8$ are hydrogen and $Z^1$ is —$C(CH_3)_2$— and oligomers, prepolymers, polymers or mixtures thereof, or
 iii) $R^1$ through $R^8$ are hydrogen and $Z^1$ is —S— and oligomers, prepolymers, polymers or mixtures thereof, or
 iv) $R^1$ through $R^8$ are hydrogen and $Z^1$ is —$C(CF_3)_2$— and oligomers, prepolymers, polymers or mixtures thereof, or
 v) $R^1$ through $R^8$ are hydrogen and $Z^1$ is —C(=$CCl_2$)— and oligomers, prepolymers, polymers or mixtures thereof, or
 vi) $R^1$ through $R^8$ are hydrogen and $Z^1$ is independently selected from the group consisting of

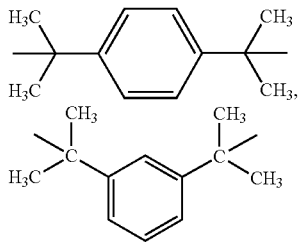

(Primaset® LM-500) and oligomers, prepolymers, polymers or mixtures thereof, or
 vii) $R^1$ through $R^8$ are hydrogen and $Z^1$ is

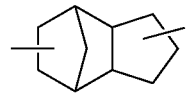

(Primaset® DT-4000) and oligomers, prepolymers, polymers or mixtures thereof, or
 viii) $R^1$ through $R^8$ are hydrogen and $Z^1$ is —CH($CH_3$)— and oligomers, prepolymers, polymers or mixtures thereof, and oligomers, prepolymers, polymers or mixtures thereof;

and/or
(ii) a polyfunctional cyanate ester of formula (II)

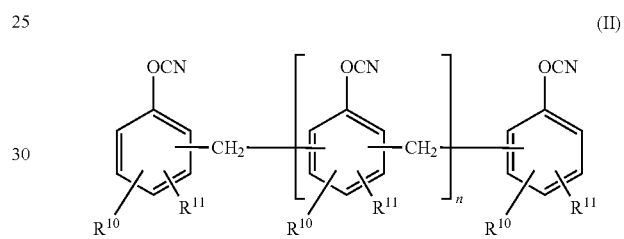

(II)

wherein the polyfunctional cyanate ester is independently selected from the group consisting of compound III, compound IV, compound V, compound VI, and oligomers, prepolymers, polymers or mixtures thereof;

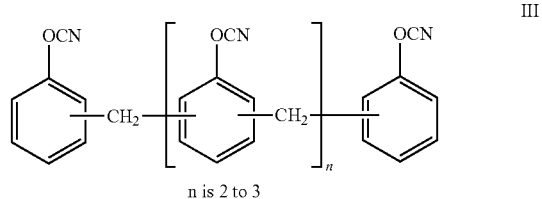

III n is 2 to 3

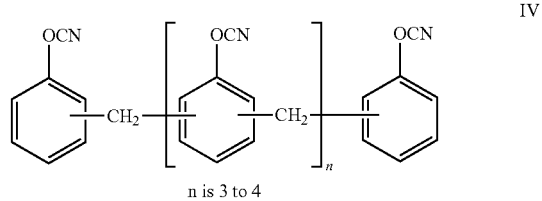

IV n is 3 to 4

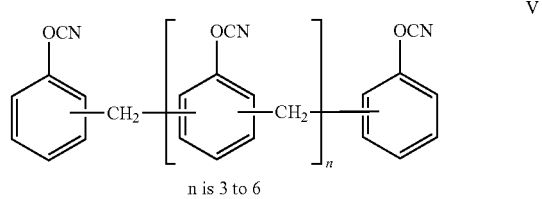

V n is 3 to 6

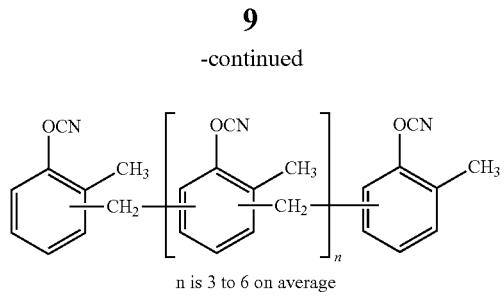

n is 3 to 6 on average and mixtures of cyanate esters of formula (I) and (II).

In one embodiment, component (b) is one or more substituted bisimide compound independently selected from a compound of formula (X)

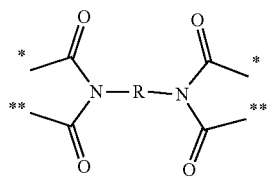

wherein * and ** each denotes a covalent bond to the respective C atom denoted with * and ** of a residue, wherein the residues are identical or different and independently selected from

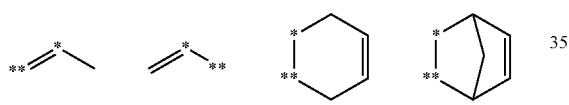

and wherein

R is independently selected from alkyl, cycloalkyl, alkyne, aryl, aralkyl and alkaryl;

and oligomers, prepolymers, polymers or mixtures of these compounds.

In another embodiment, R in component of formula (X) is independently selected from aryl, linear or branched $C_{1-10}$ alkyl, $C_3$-$C_8$ cycloalkyl, $C_{2-10}$ alkyne or the moiety <<"N"—R—"N">>, wherein <<"N"—R—"N">> is an aromatic amine moiety independently selected from ("N" denotes the point of connectivity)

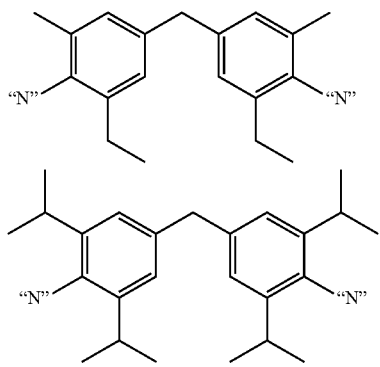

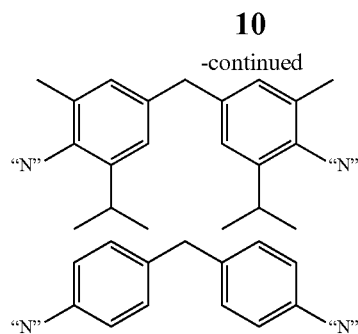

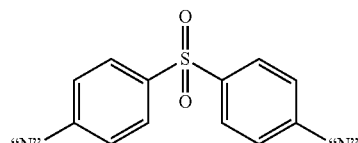

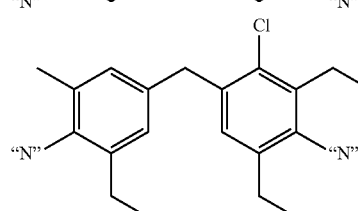

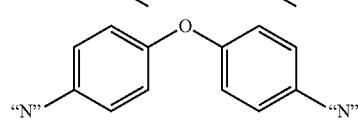

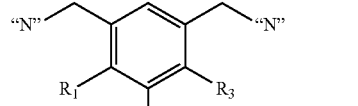

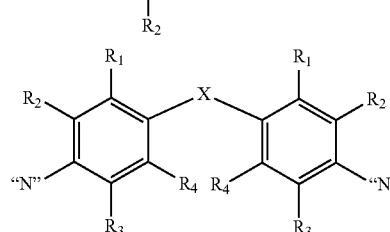

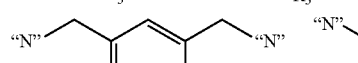

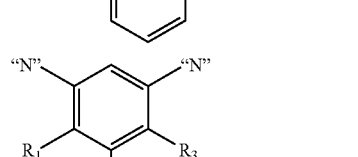

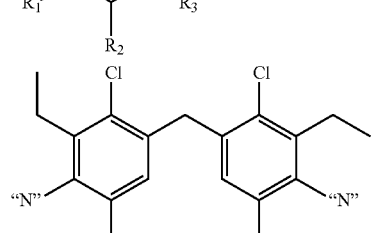

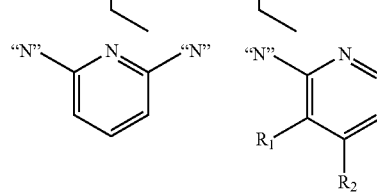

-continued

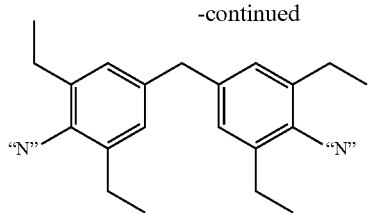

wherein
$R_1$, $R_2$, $R_3$ and $R_4$ are each independently selected from hydrogen, $C_2$-$C_{20}$ alkyl, $C_2$-$C_{20}$ alkene, $C_2$-$C_{20}$ alkyne, halogen (preferably Cl, Br, F, or I), $NO_2$, and sulfone; and X is independently selected from $C_1$-$C_{20}$ alkyl, $C_2$-$C_{20}$ alkene, $C_2$-$C_{20}$ alkyne and sulfone;

and oligomers, prepolymers, polymers or mixture thereof.

In another embodiment component (b) is one or more substituted bisimide compound independently selected from b1) at least one selected from the group of biscitraconimide compound of formula (X1), bisitaconimide compound of formula (X2) and citraconimido-itaconimide compound of formula (X3) and oligomers, prepolymers, polymers or mixtures thereof, (X1)
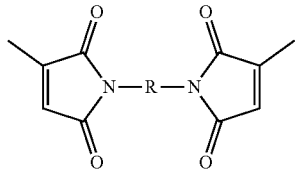

(X2)
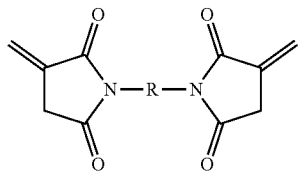

(X3)

or
b2) a bisnadicimide compound of formula (X4) and oligomers, prepolymers, polymers or mixtures thereof, (X4)
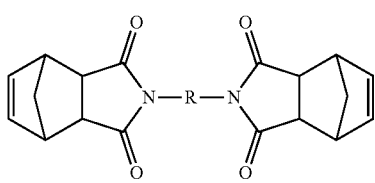

or
b3) a bistetrahydroimide compound of formula (X5) and oligomers, prepolymers, polymers or mixtures thereof, (X5)
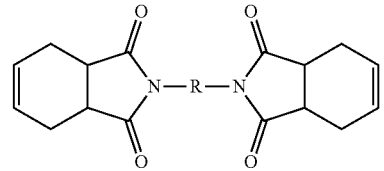

wherein
R is independently selected from aryl, linear or branched $C_1$-$C_{10}$ alkyl, $C_3$-$C_8$ cycloalkyl, $C_2$-$C_{10}$ alkyne or the moiety <<"N"—R—"N">>, wherein <<"N"—R—"N">> is an aromatic amine moiety independently selected from ("N" denotes the point of connectivity)

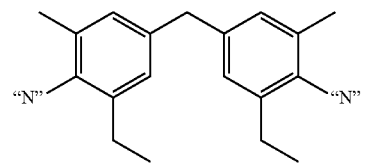

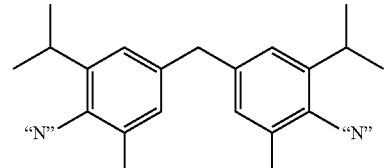

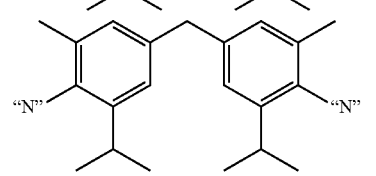

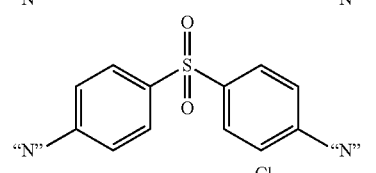

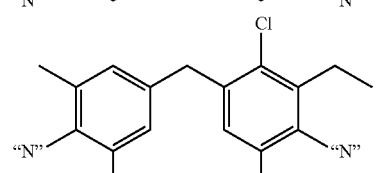

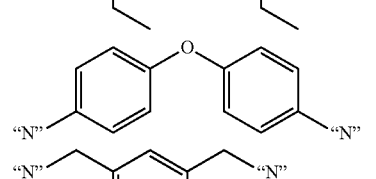

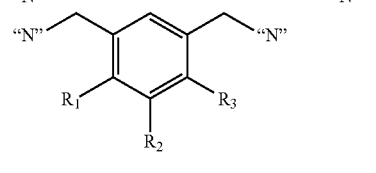

-continued

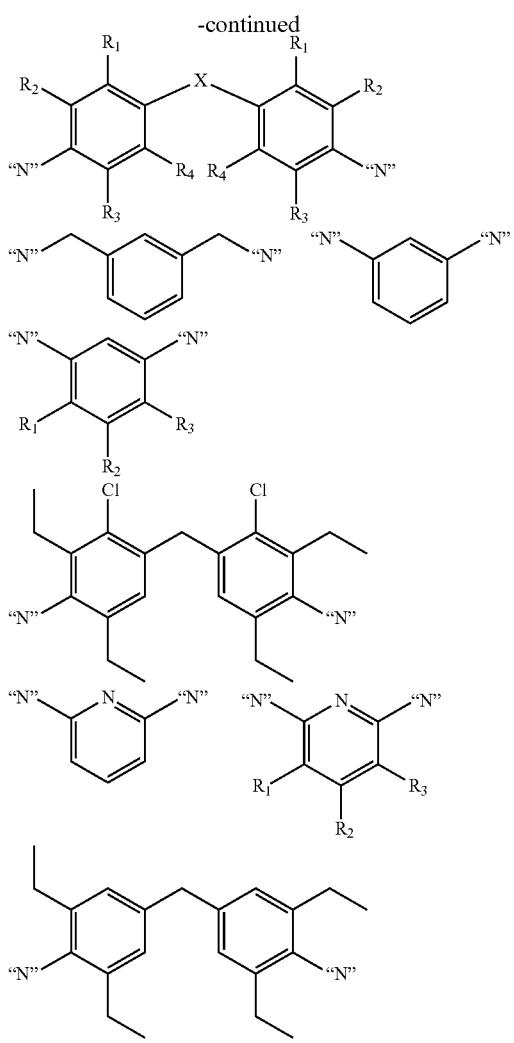

wherein
R₁, R₂, R₃ and R₄ are each independently selected from hydrogen, $C_1$-$C_{20}$ alkyl, $C_2$-$C_{20}$ alkene, $C_2$-$C_{20}$ alkyne, halogen (preferably Cl, Br, F, or I), $NO_2$, and sulfone;
X is independently selected from $C_1$-$C_{20}$ alkyl, $C_2$-$C_{20}$ alkene, $C_2$-$C_{20}$ alkyne and sulfone;
and oligomers, prepolymers, polymers or mixture thereof.

In another embodiment, component (b) is one or more substituted bisimide compound independently selected from b1) at least one selected from the group of biscitraconimide compound of formula (X1), bisitaconimide compound of formula (X2) and citraconimido-itaconimide compound of formula (X3), and oligomers, prepolymers, polymers or mixtures thereof,

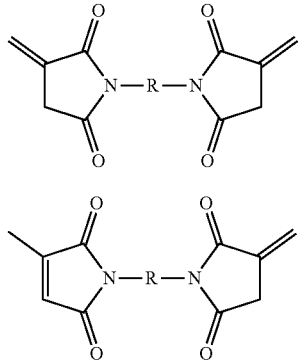
(X1)

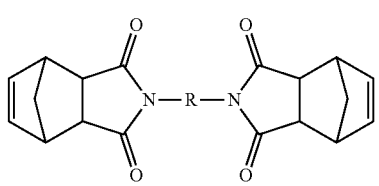
(X2)

(X3)

or
b2) a bisnadicimide compound of formula (X4) and oligomers, prepolymers, polymers or mixtures thereof,

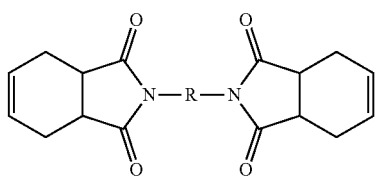
(X4)

or
b3) a bistetrahydroimide compound of formula (X5) and oligomers, prepolymers, polymers or mixtures thereof (X5)

wherein R is <<"N"—R—"N">> which is an aromatic amine moiety independently selected from ("N" denotes the point of connectivity)

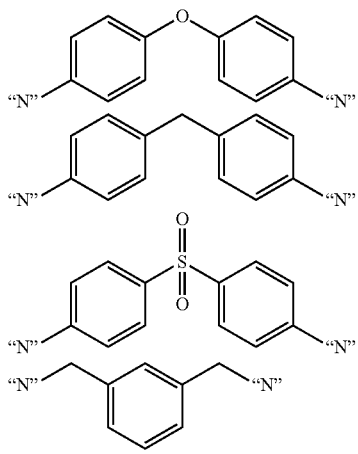

-continued

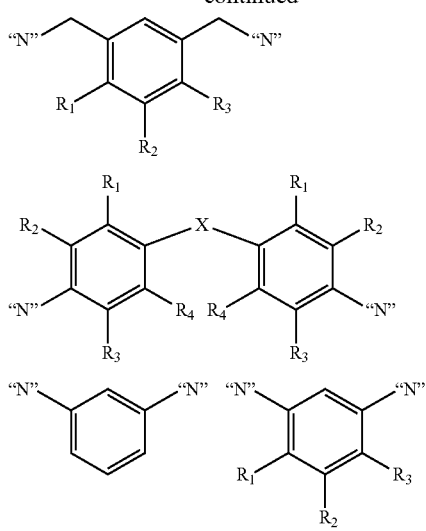

wherein

R₁, R₂, R₃ and R₄ are each independently selected from hydrogen, $C_1$-$C_5$ alkyl, halogen (preferably Cl, Br, or F), $NO_2$, and sulfone;

and oligomers, prepolymers, polymers or mixtures thereof.

In another embodiment, component (b) is one or more substituted bisimide compound independently selected from b1) at least one selected from the group of biscitraconimide compound of formula (X1), bisitaconimide compound of formula (X2) and citraconimido-itaconimide compound of formula (X3) and oligomers, prepolymers, polymers or mixtures thereof,

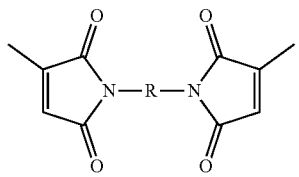 (X1)

 (X2)

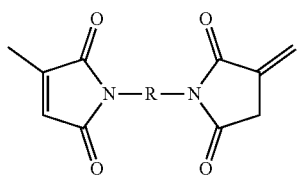 (X3)

or b2) a bisnadicimide compound of formula (X4) and oligomers, prepolymers, polymers or mixtures thereof,

 (X4)

or b3) a bistetrahydroimide compound of formula (X5) and oligomers, prepolymers, polymers or mixtures thereof

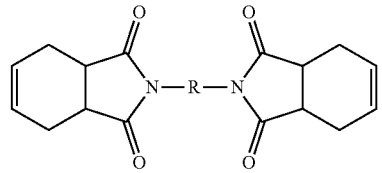 (X5)

wherein R is independently selected from 4,4'-methylene diphenylene, o-phenylene, and o-xylylene;

and oligomers, prepolymers, polymers or mixtures thereof.

In the context of the present invention, it is to be understood that component (b) can be any mixture of compounds of formula X, such as any mixture containing two or more of X1, X2, X3, X4, and X5, or any mixture containing X1, X2, and X3.

In a further preferred embodiment, component (b) is one or more substituted bisimide compound selected from the group consisting of biscitraconimide compound of formula (X1), bisitaconimide compound of formula (X2) and citraconimido-itaconimide compound of formula (X3), (X1)

(X2)

(X3)

wherein R is independently selected from 4,4'-methylene diphenylene, o-phenylene, and o-xylylene;

and oligomers, prepolymers, polymers or mixtures thereof.

In another embodiment, component (b) is one or more substituted bisimide compound selected from the group consisting of biscitraconimide compound of formula (X1), bisitaconimide compound of formula (X2), and citraconimido-itaconimide compound of formula (X3),

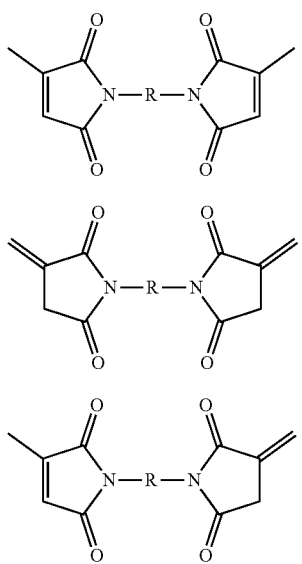

(X1)

(X2)

(X3)

wherein R is o-xylylene;
and oligomers, prepolymers, polymers or mixtures thereof.

In another embodiment, component (b) is a biscitraconimide compound of formula (X1),

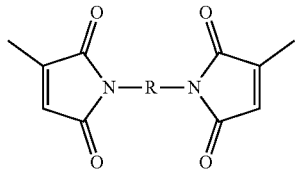

(X1)

wherein R is selected from o-xylylene;
and oligomers, prepolymers, polymers or mixtures thereof.

In the compositions according to the invention the ratio of component (a) to component (b) may vary depending on the thermoset composite to be formed and the desired properties thereof (e.g. thermal-oxidative stability, glass transition temperature (Tg) and reduction in void formation.

In one embodiment the ratio of component (a) to component (b) is from 80 wt % component (a) to 20 wt % component (b), from 75 wt % component (a) to 25 wt % component (b) from 70 wt % component (a) to 30 wt % component (b), from 65 wt % component (a) to 35 wt % component (b), from 60 wt % component (a) to 40 wt % component (b), from 55 wt % component (a) to 45 wt % component (b), from 50 wt % component (a) to 50 wt % component (b), from 45 wt % component (a) to 55 wt % component (b), from 40 wt % component (a) to 60 wt % component (b), from 35 wt % component (a) to 65 wt % component (b), from 30 wt % component (a) to 70 wt % component (b), from 25 wt % component (a) to 75 wt % component (b) based on total amount of the resin composition.

In one embodiment the ratio of component (a) to component (b) is 80 parts by weight of component (a) to 20 parts by weight of component (b) based on total amount of the resin composition, in order to allow a good processability of the mixture.

In one embodiment the ratio of component (a) to component (b) is 70 parts by weight of component (a) to 30 parts by weight of component (b) based on total amount of the resin composition, in order to allow a good processability of the mixture.

In one embodiment the ratio of component (a) to component (b) is 60 parts by weight of component (a) to 40 parts by weight of component (b) based on total amount of the resin composition, in order to allow a good processability of the mixture.

In one embodiment the ratio of component (a) to component (b) is 50 parts by weight of component (a) to 50 parts by weight of component (b) based on total amount of the resin composition, in order to allow a good processability of the mixture.

Embodiments according to the invention are provided as set out below.

Embodiment 1 provides a composition comprising components (a) and (b) as defined above.

Embodiment 2 provides a composition according to embodiment 1 wherein component (a) is one or more cyanate esters independently selected from
(i) a difunctional cyanate ester compound of formula (I)

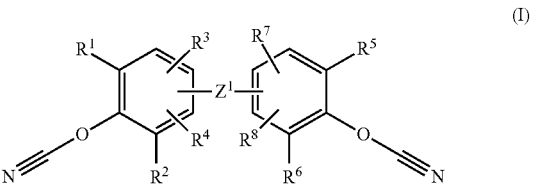

(I)

wherein
$R^1$ through $R^8$ are independently selected from the group consisting of hydrogen, linear $C_{1-10}$ alkyl, $C_{3-8}$ cycloalkyl;
$Z^1$ indicates a direct bond or a divalent moiety selected from the group consisting of —O—, —S—, —S(=O)—, —S(=O)$_2$—, —CH$_2$—, —CH(CH$_3$)—, —C(CH$_3$)$_2$—, —CH(CF$_3$)—, —C(CF$_3$)$_2$—, —C(=O)—, —C(=CH$_2$)—, —C(=CCl$_2$)—, —Si(CH$_3$)$_2$—, linear $C_{1-10}$ alkanediyl, branched $C_{4-10}$ alkanediyl, $C_{3-8}$ cycloalkanediyl, 1,2-phenylene, 1,3-phenylene, 1,4-phenylene, —N($R^{13}$)— wherein $R^{13}$ is selected from the group consisting of hydrogen, linear $C_{1-10}$ alkyl, $C_{3-8}$ cycloalkyl, phenyl and phenoxy, and moieties of formulas

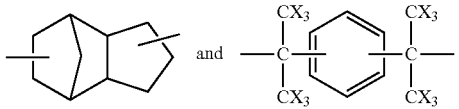

wherein X is independently selected from hydrogen and halogen; and oligomers, prepolymers, polymers or mixtures thereof;

and/or
(ii) a polyfunctional cyanate ester of formula (II)

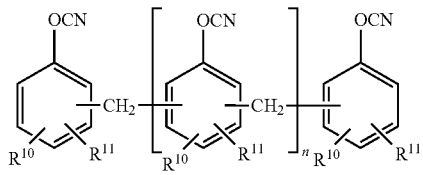

(II)

wherein
n is an integer from 1 to 20; and $R^{10}$ and $R^{11}$ are identical or different and independently from each other selected from the group consisting of hydrogen, linear $C_{1-10}$ alkyl and branched $C_4$-$C_{10}$ alkyl; and oligomers, prepolymers, polymers or mixtures thereof, and mixtures of cyanate esters of formula (I) and (II).

Embodiment 3 provides a composition according to embodiment 1 or 2 wherein component (b) is one or more substituted bisimide independently selected from a biscitraconimide compound of formula (X1),

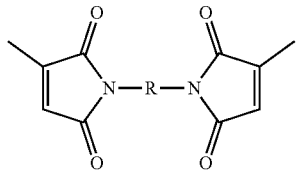

(X1)

wherein R is selected from o-xylylene, and oligomers, prepolymers, polymers or mixtures thereof, or b1) at least one selected from the group of biscitraconimide compound of formula (X1), bisitaconimide compound of formula (X2) and citraconimido-itaconimide compound of formula (X3), and oligomers, prepolymers, polymers or mixtures thereof,

(X1)

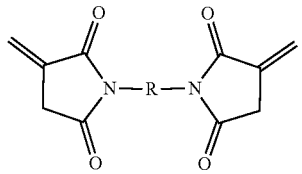

(X2)

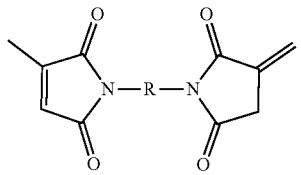

(X3)

or b2) a bisnadicimide compound of formula (X4) and oligomers, prepolymers, polymers or mixtures thereof,

(X4)

or b3) a bistetrahydroimide compound of formula (X5) and oligomers, prepolymers, polymers or mixtures thereof

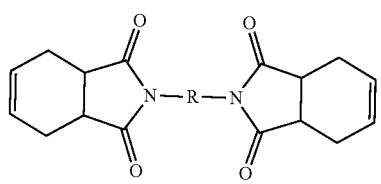

(X5)

wherein

R is independently selected from aryl, linear or branched $C_1$-$C_{10}$ alkyl, $C_3$-$C_8$ cycloalkyl, $C_2$-$C_{10}$ alkyne or the moiety <<"N"—R—"N">>, wherein <<"N"—R—"N">> is an aromatic amine moiety independently selected from ("N" denotes the point of connectivity)

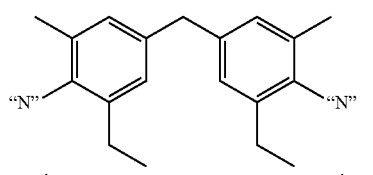

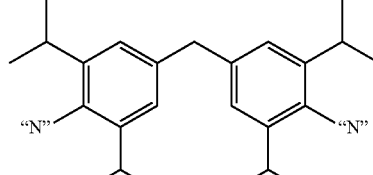

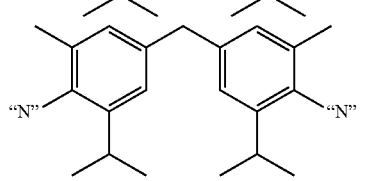

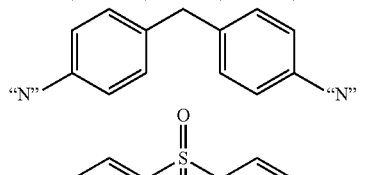

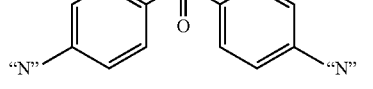

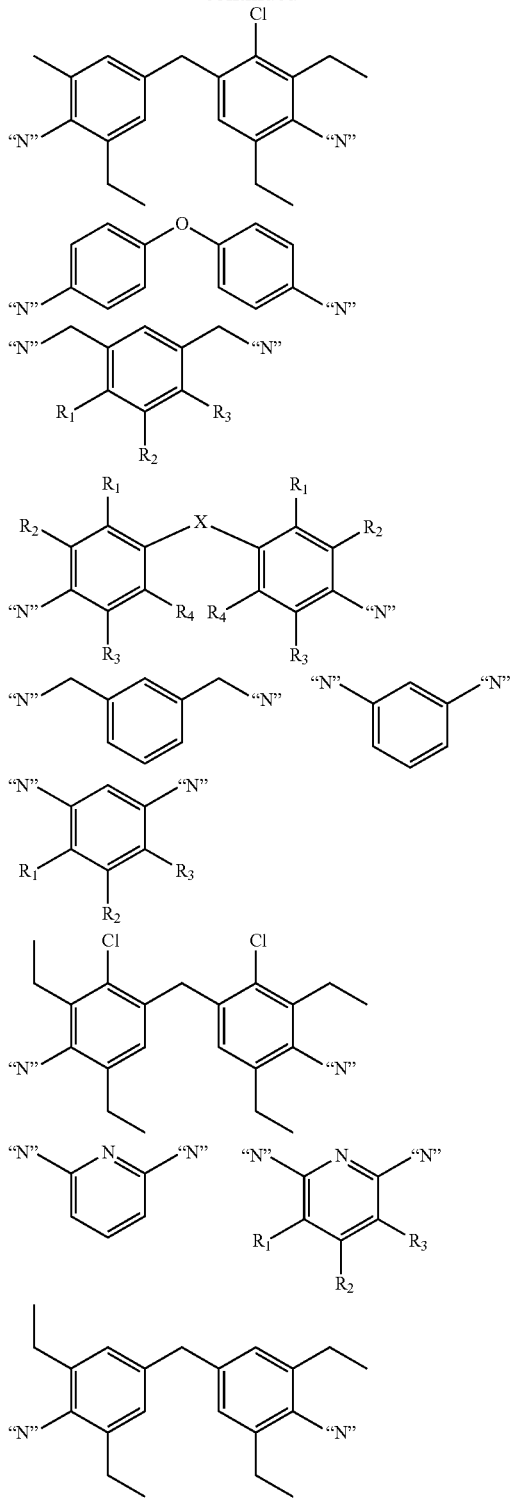

wherein
R₁, R₂, R₃ and R₄ are each independently selected from hydrogen, $C_1$-$C_{20}$ alkyl, $C_2$-$C_{20}$ alkene, $C_2$-$C_{20}$ alkyne, halogen (preferably Cl, Br, F, or I), $NO_2$, and sulfone; X is independently selected from $C_1$-$C_{20}$ alkyl, $C_2$-$C_{20}$ alkene, $C_2$-$C_{20}$ alkyne and sulfone; and oligomers, prepolymers, polymers or mixtures thereof.

Embodiment 4 provides a composition according to any one of embodiments 1, 2 or 3 wherein component (a) is one or more cyanate esters independently selected from
(i) a difunctional cyanate ester compound of formula (I)

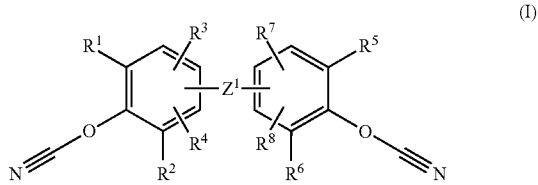

wherein
$R^1$ through $R^8$ are independently selected from the group consisting of hydrogen, linear $C_{1-3}$ alkyl;
$Z^1$ indicates a direct bond or a divalent moiety selected from the group consisting of —O—, —S—, —S(=O)—, —S(=O)$_2$—, —CH$_2$—, —CH(CH$_3$)—, —C(CH$_3$)$_2$—, —CH(CF$_3$)—, —C(CF$_3$)$_2$—, —C(=CCl$_2$)—, —Si(CH$_3$)$_2$—, branched $C_{4-8}$ alkanediyl, $C_{3-8}$ cycloalkanediyl, 1,2-phenylene, 1,3-phenylene, 1,4-phenylene; and oligomers, prepolymers, polymers or mixtures thereof; and/or
(ii) a polyfunctional cyanate ester of formula (II)

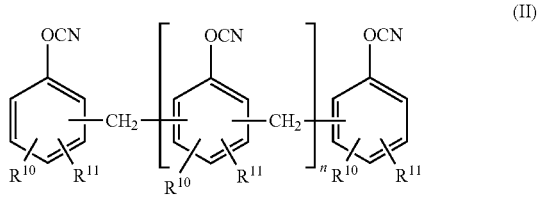

wherein
n is an integer from 1 to 15; and $R^{10}$ and $R^{11}$ are identical or different and independently from each other selected from the group consisting of hydrogen, linear $C_{1-8}$ alkyl and branched $C_{4-8}$ alkyl; and oligomers, prepolymers, polymers or mixtures thereof;
and mixtures of cyanate esters of formula (I) and (II).

Embodiment 5 provides a composition according to any one of embodiments 1, 2, 3 or 4 wherein component (b) is one or more substituted bisimide independently selected from a biscitraconimide compound of formula (X1),

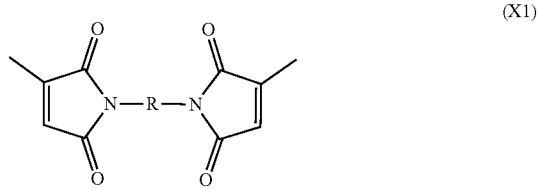

wherein R is selected from o-xylylene, and oligomers, prepolymers, polymers or mixtures thereof, or
b1) at least one selected from the group of biscitraconimide compound of formula (X1), bisitaconimide compound of formula (X2) and citraconimido-itaconimide compound of formula (X3), and oligomers, prepolymers, polymers or mixtures thereof, (X1)

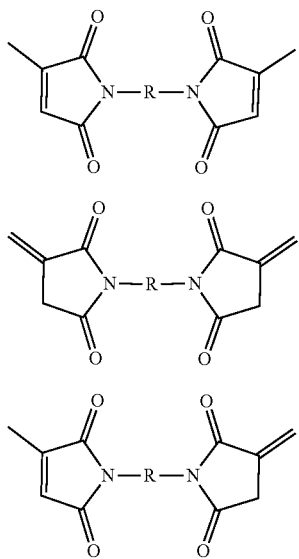

or
b2) a bisnadicimide compound of formula (X4) and oligomers, prepolymers, polymers or mixtures thereof, (X4)

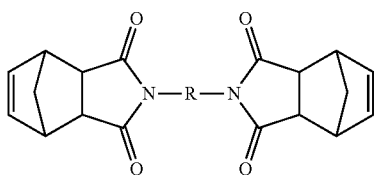

or
b3) a bistetrahydroimide compound of formula (X5) and oligomers, prepolymers, polymers or mixtures thereof (X5)

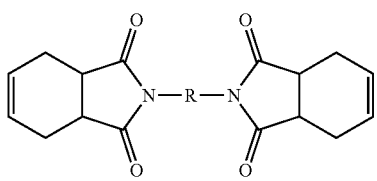

wherein R is the moiety <<"N"—R—"N">> which is an aromatic amine moiety independently selected from ("N" denotes the point of connectivity)

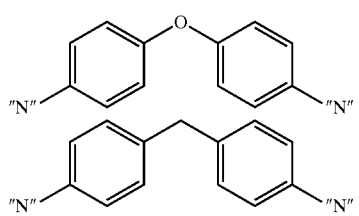

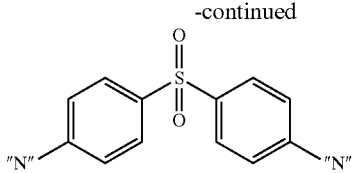

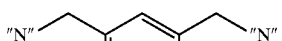

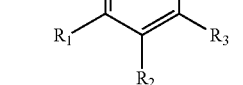

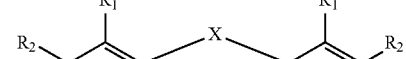

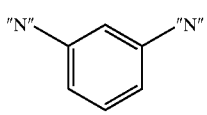

wherein
$R_1$, $R_2$, $R_3$ and $R_4$ are each independently selected from hydrogen, $C_1$-$C_5$ alkyl, halogen (preferably Cl, Br, or F), $NO_2$, and sulfone;
and oligomers, prepolymers, polymers or mixtures thereof.

Embodiment 6 provides a composition according to any one of embodiments 1, 2, 3, 4, or 5 wherein component (a) is one or more cyanate esters independently selected from
(i) a difunctional cyanate ester compound of formula (I)

(I)

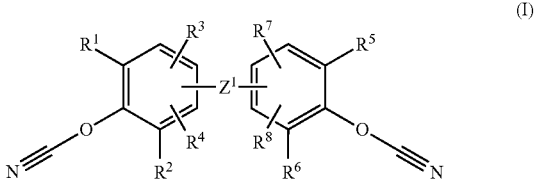

wherein
$R^1$ through $R^8$ are independently selected from the group consisting of hydrogen, linear $C_{1-3}$ alkyl;
$Z^1$ indicates a direct bond or a divalent moiety selected from the group consisting of —O—, —S—, —S(=O)$_2$—, —CH$_2$—, —CH(CH$_3$)—, —C(CH$_3$)$_2$—, —C(CF$_3$)$_2$—, —C(=CCl$_2$)—, branched $C_{2-6}$ alkanediyl, $C_{3-8}$ cycloalkanediyl, 1,2-phenylene, 1,3-phenylene, 1,4-phenylene; and oligomers, prepolymers, polymers or mixtures thereof;

and/or
(ii) a polyfunctional cyanate ester of formula (II)

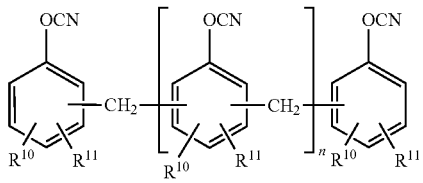
(II)

wherein
n is an integer from 1 to 10; and $R^{10}$ and $R^{11}$ are identical or different and independently from each other selected from the group consisting of hydrogen, linear $C_{1-5}$ alkyl and branched $C_{4-6}$ alkyl; and oligomers, prepolymers, polymers or mixtures thereof, and mixtures of cyanate esters of formula (I) and (II).

Embodiment 7 provides a composition according to any one of embodiments 1, 2, 3, 4, 5, or 6 wherein component (b) is one or more substituted bisimide independently selected from a biscitraconimide compound of formula (X1),

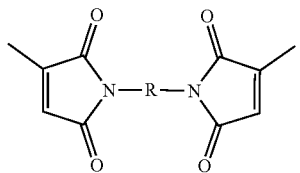
(X1)

wherein R is selected from o-xylylene, and oligomers, prepolymers, polymers or mixtures thereof, or b1) at least one selected from the group of biscitraconimide compound of formula (X1), bisitaconimide compound of formula (X2) and citraconimido-itaconimide compound of formula (X3), and oligomers, prepolymers, polymers or mixtures thereof,

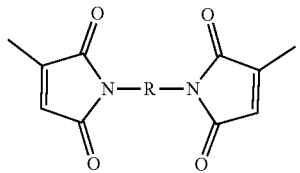
(X1)

(X2)

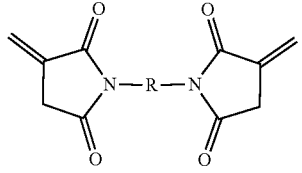
(X3)

or
b2) a bisnadicimide compound of formula (X4) and oligomers, prepolymers, polymers or mixtures thereof,

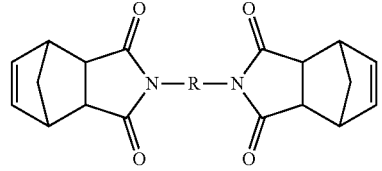
(X4)

or
b3) a bistetrahydroimide compound of formula (X5) and oligomers, prepolymers, polymers or mixtures thereof

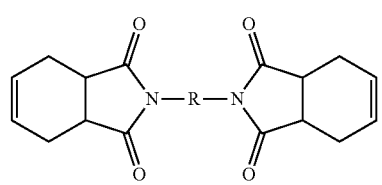
(X5)

wherein R is independently selected from 4,4'-methylene diphenylene, and o-phenylene, o-xylylene, and oligomers, prepolymers, polymers or mixtures thereof.

Embodiment 8 provides a composition according to any one of embodiments 1, 2, 3, 4, 5, 6, or 7 wherein component (a) is one or more cyanate esters independently selected from (i) a difunctional cyanate ester compound of formula (I)

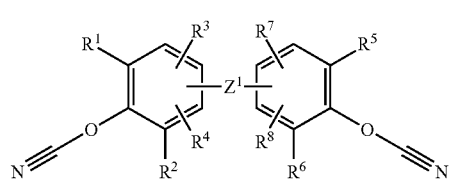
(I)

wherein the difunctional cyanate ester of formula I is independently selected from the group consisting of i) $R^1$, $R^2$, $R^5$ and $R^6$ are methyl, $R^3$, $R^4$, $R^7$ and $R^8$ are hydrogen and wherein $Z^1$ is —$CH_2$-(methylene) and oligomers, prepolymers, polymers or mixtures thereof, or ii) $R^1$ through $R^8$ are hydrogen and $Z^1$ is —$C(CH_3)_2$— (Primaset® BADCy) and oligomers, prepolymers, polymers or mixtures thereof, or iii) $R^1$ through $R^8$ are hydrogen and $Z^1$ is —S— and oligomers, prepolymers, polymers or mixtures thereof, or iv) $R^1$ through $R^8$ are hydrogen and $Z^1$ is —$C(CF_3)_2$— and o oligomers, prepolymers, polymers or mixtures thereof, or v) $R^1$ through $R^8$ are hydrogen and $Z^1$ is —C(=$CCl_2$)— and oligomers, prepolymers, polymers or mixtures thereof, or vi) R¹ through R⁸ are hydrogen and Z¹ is independently selected from the group consisting of

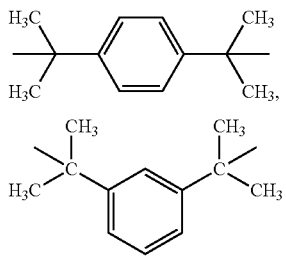

(Primaset® LM-500) and oligomers, prepolymers, polymers or mixtures thereof, or vii) R¹ through R⁸ are hydrogen and Z¹ is

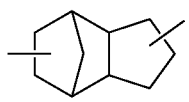

(Primaset® DT-4000)

(Primaset® DT-4000) and oligomers, prepolymers, polymers or mixtures thereof, or viii) R¹ through R⁸ are hydrogen and Z¹ is —CH(CH₃)— and oligomers, prepolymers, polymers or mixtures thereof, and oligomers, prepolymers, polymers or mixtures thereof;

and/or (ii) a polyfunctional cyanate ester of formula (II)

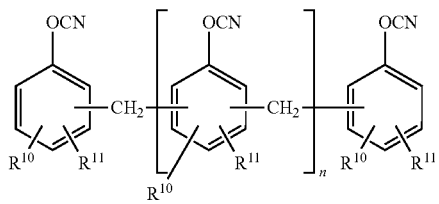
(II)

wherein the polyfunctional cyanate ester is independently selected from the group consisting of compound III, compound IV, compound V, and compound VI, and oligomers, prepolymers, polymers or mixtures thereof;

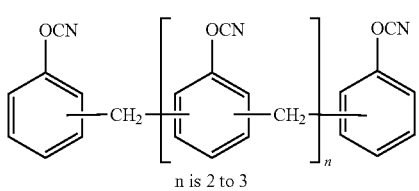
III n is 2 to 3

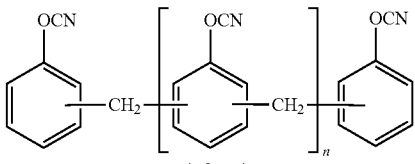
IV n is 3 to 4

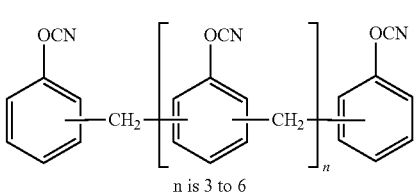
V n is 3 to 6

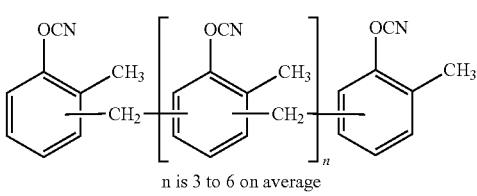
VI n is 3 to 6 on average and mixtures of cyanate esters of formula (I) and (II).

Embodiment 9 provides a composition according to any one of embodiments 1, 2, 3, 4, 5, 6, 7, or 8 wherein component (b) is one or more substituted bisimide independently selected from a biscitraconimide compound of formula (X1),

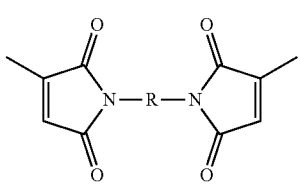
(X1)

wherein R is selected from o-xylylene, and oligomers, prepolymers, polymers or mixtures thereof, or b1) at least one selected from the group of biscitraconimide compound of formula (X1), bisitaconimide compound of formula (X2) and citraconimido-itaconimide compound of formula (X3), and oligomers, prepolymers, polymers or mixtures thereof,

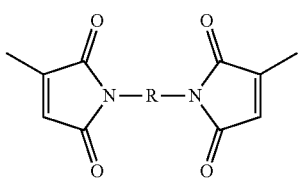
(X1)

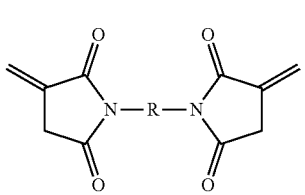
(X2)

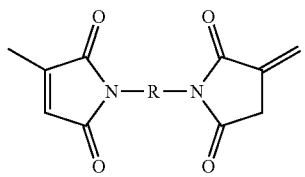

or b2) a bisnadicimide compound of formula (X4) and oligomers, prepolymers, polymers or mixtures thereof,

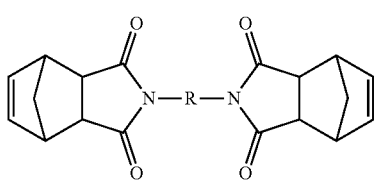

or b3) a bistetrahydroimide compound of formula (X5) and oligomers, prepolymers, polymers or mixtures thereof

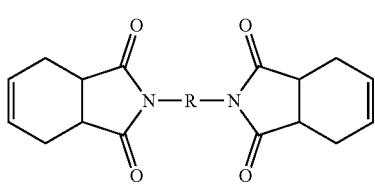

wherein R is independently selected from 4,4'-methylene diphenylene, o-phenylene, and o-xylylene, and oligomers, prepolymers, polymers or mixtures thereof.

Embodiment 10 provides a composition according to any one of embodiments 1, 2, 3, 4, 5, 6, 7, 8, or 9 wherein component (b) is one or more substituted bisimide independently selected from a biscitraconimide compound of formula (X1),

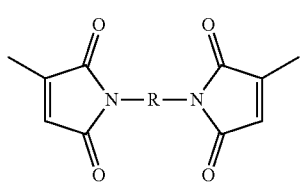

or b1) at least one selected from the group of biscitraconimide compound of formula (X1), bisitaconimide compound of formula (X2) and citraconimido-itaconimide compound of formula (X3), and oligomers, prepolymers, polymers or mixtures thereof,

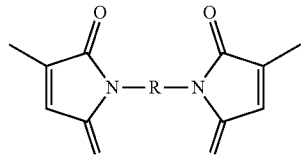

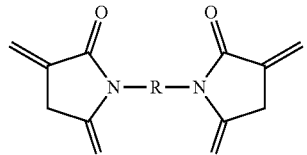

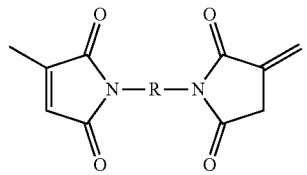

or b2) a bisnadicimide compound of formula (X4) and oligomers, prepolymers, polymers or mixtures thereof,

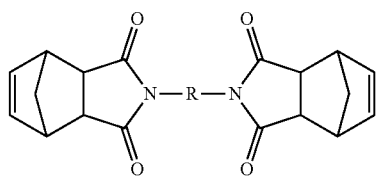

or b3) a bistetrahydroimide compound of formula (X5) and oligomers, prepolymers, polymers or mixtures thereof (X5)

wherein R is o-xylylene, and oligomers, prepolymers, polymers or mixtures thereof.

Embodiment 11 provides a composition according to any one of embodiments 1, 2, 3, 4, 5, 6, 7, 8, 9 or 10 wherein the ratio of component (a) to component (b) is 80 wt % component (a) to is 20 wt % component (b) based on the total amount of the resin composition.

Embodiment 12 provides a composition according to any one of embodiments 1, 2, 3, 4, 5, 6, 7, 8, 9, 10 or 11 wherein the ratio of component (a) to component (b) is 75 wt % component (a) to is 25 wt % component (b) based on the total amount of the resin composition.

Embodiment 13 provides a composition according to any one of embodiments 1, 2, 3, 4, 5, 6, 7, 8, 9, 10, 11 or 12 wherein the ratio of component (a) to component (b) is 70 wt % component (a) to is 30 wt % component (b) based on the total amount of the resin composition.

Embodiment 14 provides a composition according to any one of embodiments 1, 2, 3, 4, 5, 6, 7, 8, 9, 10, 11, 12 or 13 wherein the ratio of component (a) to component (b) is 60 wt % component (a) to is 40 wt % component (b) based on the total amount of the resin composition.

Embodiment 15 provides a composition according to any one of embodiments 1, 2, 3, 4, 5, 6, 7, 8, 9, 10, 11, 12, 13 or 14 wherein the ratio of component (a) to component (b) is 55 wt % component (a) to is 45 wt % component (b) based on the total amount of the resin composition.

Embodiment 16 provides a composition according to any one of embodiments 1, 2, 3, 4, 5, 6, 7, 8, 9, 10, 11, 12, 13, 14 or 15 wherein the ratio of component (a) to component (b) is 50 wt % component (a) to is 50 wt % component (b) based on the total amount of the resin composition.

Embodiment 17 provides a composition according to any one of embodiments 1, 2, 3, 4, 5, 6, 7, 8, 9, 10, 11, 12, 13, 14, 15 or 16 wherein the composition further comprises a catalyst selected from the group consisting of aliphatic mono-, di- and polyamines, aromatic mono-, di- and polyamines, carbocyclic mono-, di and polyamines, heterocyclic mono-, di- and polyamines, compounds containing a five- or six-membered nitrogen-containing heterocyclic ring, hydroxyamines, phosphines, phenols, and mixtures thereof.

Embodiment 18 provides a composition according to any one of embodiments 1, 2, 3, 4, 5, 6, 7, 8, 9, 10, 11, 12, 13, 14, 15, 16 or 17 wherein the composition further comprises reinforcement fibres selected from the group consisting of carbon fibres, glass fibres (such as E glass fibres, S glass fibres), aramid fibres (including KEVLAR®), basalt fibres (geotextile fibers), natural fibres (such as flax, hemp, jute or sisal), fleeces and woven fabrics (multi-layered or single layered), and mixtures thereof.

Embodiment 19 provides a composition according to any one of embodiments 1, 2, 3, 4, 5, 6, 7, 8, 9, 10, 11, 12, 13, 14, 15, 16, 17 or 18 wherein the composition further comprise a filler selected from the group consisting of organic fillers, such as thermoplastics and elastomers, inorganic fillers, such as glass microspheres, graphite or silica, and mineral powder fillers, such as $CaCO_3$, coated $CaCO_3$, kaolin clay, $SiO_2$, talc, graphite, corundum ($\alpha$-$Al_2O_3$), wollastonite, SiC, glass microspheres, mica, calcium silicate ($Ca_2O_4Si$), MgO, anhydrous calcium sulfate ($CaSO_4$ or anhydrite), ceramic hollow microspheres, fused mullite ($Al_2O_3$—$SiO_2$), boron nitride (BN), vermiculite, or basalt, and mixtures thereof.

Embodiment 20 provides a composition according to any one of embodiments 1, 2, 3, 4, 5, 6, 7, 8, 9, 10, 11, 12, 13, 14, 15, 16, 17, 18 or 19 wherein component (a) is one or more cyanate esters independently selected from (i) a difunctional cyanate ester compound of formula (I)

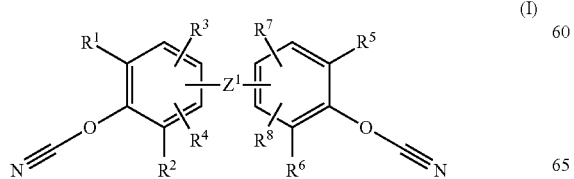

wherein $R^1$ through $R^8$ are hydrogen and $Z^1$ is —CH($CH_3$)— and oligomers, prepolymers, polymers or mixtures thereof;

and/or (ii) a polyfunctional cyanate ester of formula (II)

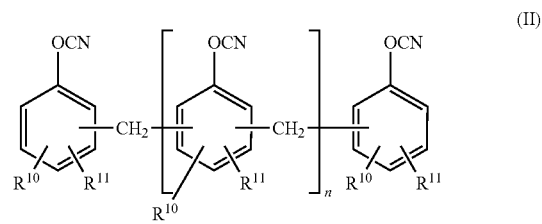

wherein the polyfunctional cyanate ester is independently selected from the group consisting of compound III, compound IV, and compound V, and oligomers, prepolymers, polymers or mixtures thereof;

and mixtures of cyanate esters of formula (I) and (II).

Embodiment 21 provides a composition according to any one of embodiments 1, 2, 3, 4, 5, 6, 7, 8, 9, 10, 11, 12, 13, 14, 15, 16, 17, 18, 19 or 20 wherein component (b) is a substituted bisimide compound selected from a biscitraconimide compound of formula (X1),

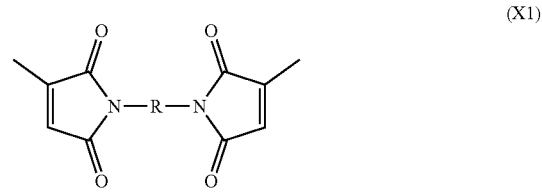

wherein R is selected from o-xylylene, and, oligomers, prepolymers, polymers or mixtures thereof.

One group of compositions according to the invention are those comprising components (a) and (b) wherein component (a) is one or more cyanate esters independently selected from (i) a difunctional cyanate ester compound of formula (I)

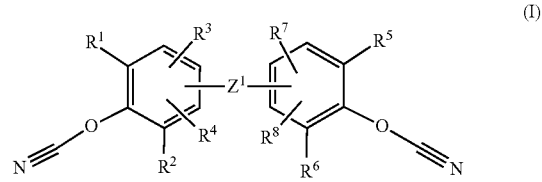

wherein $R^1$ through $R^8$ are independently selected from the group consisting of hydrogen, linear $C_{1-10}$ alkyl, $C_{3-8}$ cycloalkyl;

$Z^1$ indicates a direct bond or a divalent moiety selected from the group consisting of —O—, —S—, —S(=O)—, —S(=O)$_2$—, —CH$_2$—, —CH(CH$_3$)—, —C(CH$_3$)$_2$—, —CH(CF$_3$)—, —C(CF$_3$)$_2$—, —C(=O)—, —C(=CH$_2$)—, —C(=CCl$_2$)—, —Si(CH$_3$)$_2$—, linear $C_{1-10}$ alkanediyl, branched $C_{4-10}$ alkanediyl, $C_{3-8}$ cycloalkanediyl, 1,2-phenylene, 1,3- phenylene, 1,4-phenylene, —N(R$^{13}$)— wherein R$^{13}$ is selected from the group consisting of hydrogen, linear C$_{1-10}$ alkyl, C$_{3-8}$ cycloalkyl, phenyl and phenoxy, and moieties of formulas

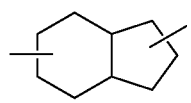 and 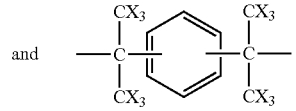

wherein X is independently selected from hydrogen and halogen; and oligomers, prepolymers, polymers or mixtures thereof;
and/or
(ii) a polyfunctional cyanate ester of formula (II)

(II)
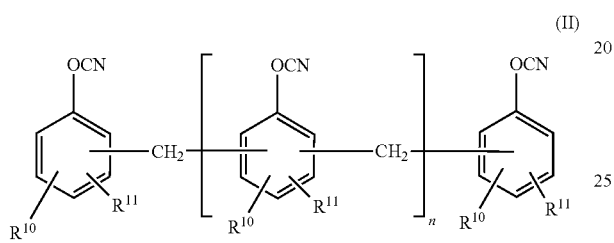

wherein
n is an integer from 1 to 20; and R$^{10}$ and R$^{11}$ are identical or different and independently from each other selected from the group consisting of hydrogen, linear C$_{1-10}$ alkyl and branched C$_{4-10}$ alkyl; and oligomers, prepolymers, polymers or mixtures thereof;
and mixtures of cyanate esters of formula (I) and (II); and
wherein component (b) is one or more substituted bisimide independently selected from a biscitraconimide compound of formula (X1), (X1)
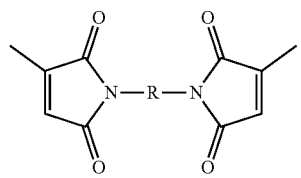

wherein R is selected from o-xylylene, and oligomers, prepolymers, polymers or mixtures thereof, or
b1) at least one selected from the group of biscitraconimide compound of formula (X1), bisitaconimide compound of formula (X2) and citraconimido-itaconimide compound of formula X3), and oligomers, prepolymers, polymers or mixtures thereof, (X1)
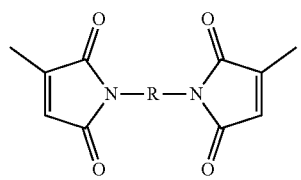

-continued (X2)
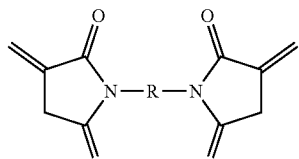

(X3)
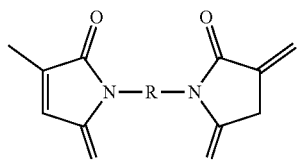

or
b2) a bisnadicimide compound of formula (X4) and oligomers, prepolymers, polymers or mixtures thereof, (X4)
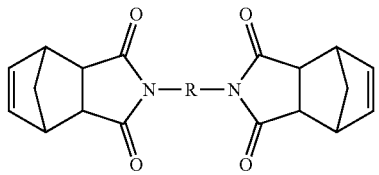

or
b3) a bistetrahydroimide compound of formula (X5) and oligomers, prepolymers, polymers or mixtures thereof (X5)
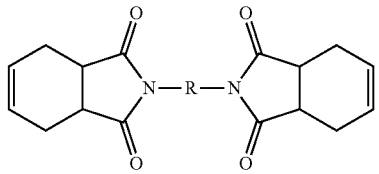

wherein
R is independently selected from aryl, linear or branched C$_1$-C$_{10}$ alkyl, C$_3$-C$_8$ cycloalkyl, C$_2$-C$_{10}$ alkyne or the moiety <<"N"—R—"N">>, wherein <<"N"—R—"N">> is an aromatic amine moiety independently selected from ("N" denotes the point of connectivity)

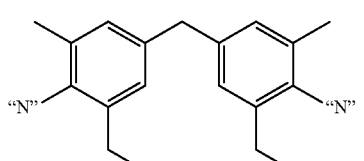

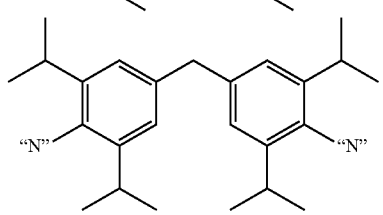

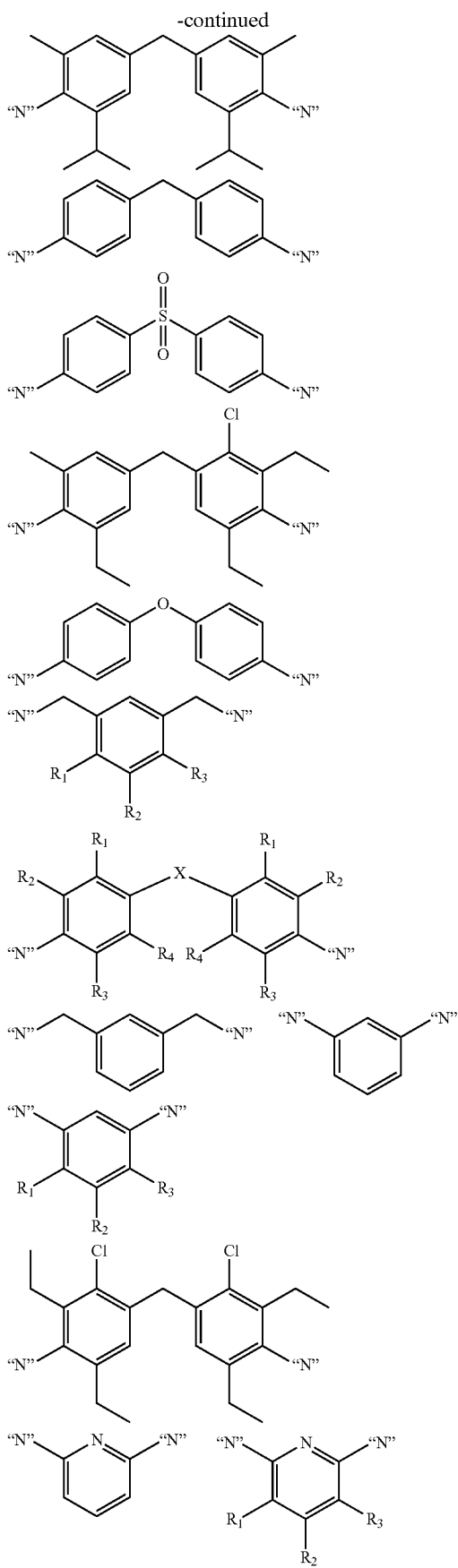

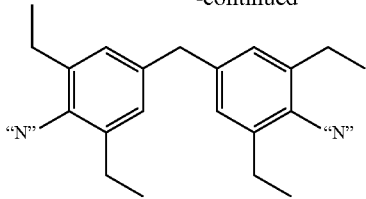

wherein
$R_1$, $R_2$, $R_3$ and $R_4$ are each independently selected from hydrogen, $C_1$-$C_{20}$ alkyl, $C_2$-$C_{20}$ alkene, $C_2$-$C_{20}$ alkyne, halogen (preferably Cl, Br, F, or I), $NO_2$, and sulfone;
X is independently selected from $C_1$-$C_{20}$ alkyl, $C_2$-$C_{20}$ alkene, $C_2$-$C_{20}$ alkyne and sulfone; and oligomers, prepolymers, polymers or mixtures thereof.

Another group of compositions according to the invention are those comprising components (a) and (b) wherein component (a) is one or more cyanate esters independently selected from
(i) a difunctional cyanate ester compound of formula (I)

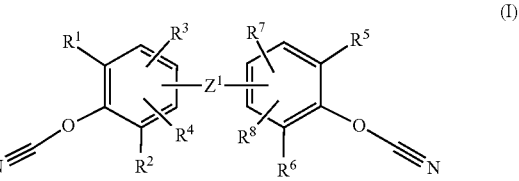

wherein
$R^1$ through $R^8$ are independently selected from the group consisting of hydrogen, linear $C_{1-3}$ alkyl;
$Z^1$ indicates a direct bond or a divalent moiety selected from the group consisting of —O—, —S—, —S(=O)—, —S(=O)$_2$—, —CH$_2$—, —CH(CH$_3$)—, —C(CH$_3$)$_2$—, —CH(CF$_3$)—, —C(CF$_3$)$_2$—, —C(=CCl$_2$)—, —Si(CH$_3$)$_2$—, branched $C_{2-8}$ alkanediyl, $C_{3-8}$ cycloalkanediyl, 1,2-phenylene, 1,3-phenylene, 1,4-phenylene; and oligomers, prepolymers, polymers or mixtures thereof, and/or
(ii) a polyfunctional cyanate ester of formula (II)

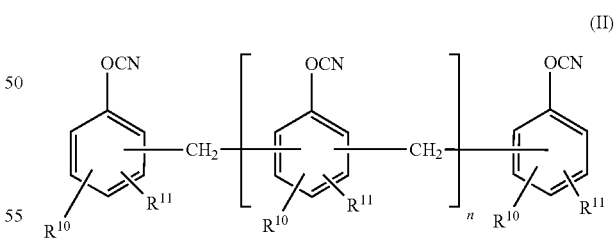

wherein
n is an integer from 1 to 15; and $R^{10}$ and $R^{11}$ are identical or different and independently from each other selected from the group consisting of hydrogen, linear $C_{1-8}$ alkyl and branched $C_{4-8}$ alkyl; and oligomers, prepolymers, polymers or mixtures thereof;
and mixtures of cyanate esters of formula (I) and (II);
and wherein component (b) is one or more substituted bisimide independently selected from a biscitraconimide compound of formula (X1),

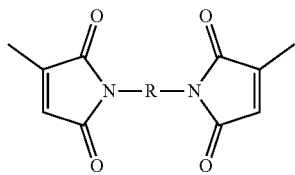

(X1)

wherein R is selected from o-xylylene, and oligomers, prepolymers, polymers or mixtures thereof, or b1) at least one selected from the group of biscitraconimide compound of formula (X1), bisitaconimide compound of formula (X2) and citraconimido-itaconimide compound of formula (X3), and oligomers, prepolymers, polymers or mixtures thereof, or

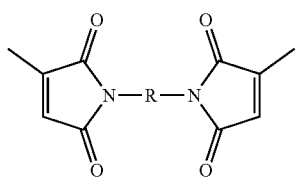

(X1)

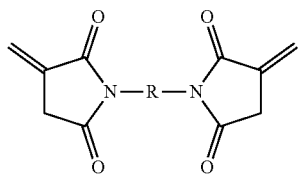

(X2)

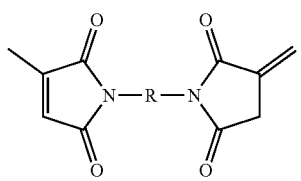

(X3)

or b2) a bisnadicimide compound of formula (X4) and oligomers, prepolymers, polymers or mixtures thereof,

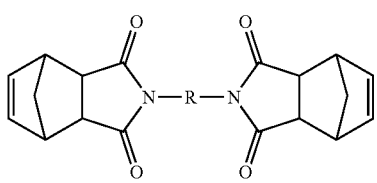

(X4)

or b3) a bistetrahydroimide compound of formula (X5) and oligomers, prepolymers, polymers or mixtures thereof

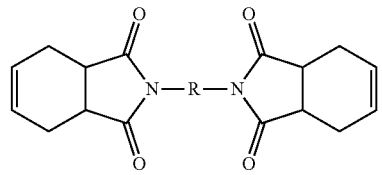

(X5)

wherein R is the moiety <<"N"—R—"N">> which is an aromatic amine moiety independently selected from ("N" denotes the point of connectivity)

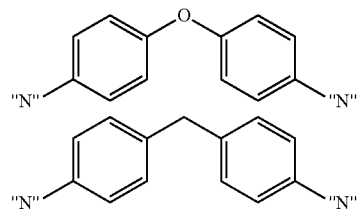

wherein
R$_1$, R$_2$, R$_3$ and R$_4$ are each independently selected from hydrogen, C$_1$-C$_5$ alkyl, halogen (preferably Cl, Br, or F), NO$_2$, and sulfon;
and oligomers, prepolymers, polymers or mixtures thereof.

Another group of compositions according to the invention are those comprising components (a) and (b) wherein component (a) is one or more cyanate esters independently selected from (i) a difunctional cyanate ester compound of formula (I)

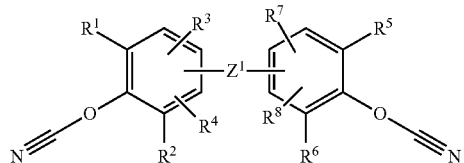
(I)

wherein
$R^1$ through $R^8$ are independently selected from the group consisting of hydrogen, linear $C_{1-3}$ alkyl;
$Z^1$ indicates a direct bond or a divalent moiety selected from the group consisting of —O—, —S—, —S(=O)$_2$—, —CH$_2$—, —CH(CH$_3$)—, —C(CH$_3$)$_2$—, —C(CF$_3$)$_2$—, —C(=CCl$_2$)—, branched $C_{4-6}$ alkanediyl, $C_{3-8}$ cycloalkanediyl, 1,2-phenylene, 1,3-phenylene, 1,4-phenylene; and oligomers, prepolymers, polymers or mixtures thereof;
and/or
(ii) a polyfunctional cyanate ester of formula (II)

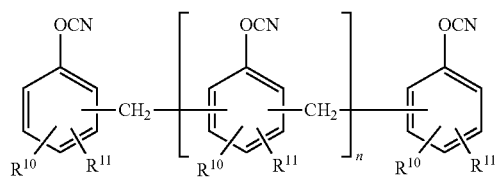
(II)

wherein
n is an integer from 1 to 10; and $R^{10}$ and $R^{11}$ are identical or different and independently from each other selected from the group consisting of hydrogen, linear $C_{1-5}$ alkyl and branched $C_{4-6}$ alkyl; and oligomers, prepolymers, polymers or mixtures thereof;
and mixtures of cyanate esters of formula (I) and (II);
and wherein component (b) is one or more substituted bisimide independently selected from a biscitraconimide compound of formula (X1),

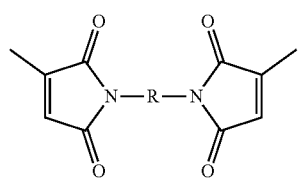
(X1)

wherein R is selected from o-xylylene, and oligomers, prepolymers, polymers or mixtures thereof, or
b1) at least one selected from the group of biscitraconimide compound of formula (X1), bisitaconimide compound of formula (X2) and citraconimido-itaconimide compound of formula (X3), and oligomers, prepolymers, polymers or mixtures thereof,

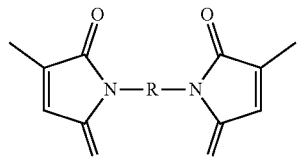
(X1)

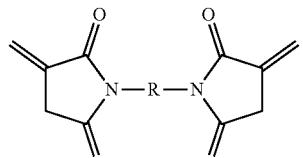
(X2)

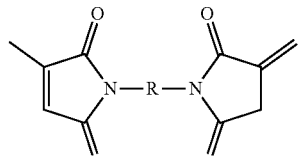
(X3)

or
b2) a bisnadicimide compound of formula (X4) and oligomers, prepolymers, polymers or mixtures thereof,

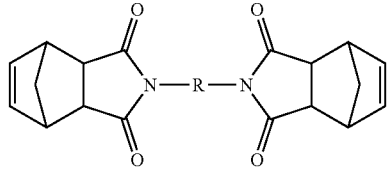
(X4)

or
b3) a bistetrahydroimide compound of formula (X5) and oligomers, prepolymers, polymers or mixtures thereof

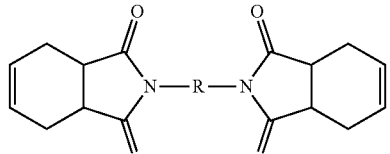
(X5)

wherein R is independently selected from 4,4'-methylene diphenylene, and o-phenylene, o-xylylene,
and oligomers, prepolymers, polymers or mixtures thereof.

Another group of compositions according to the invention are those comprising components (a) and (b) wherein component (a) is one or more cyanate esters independently selected from (i) a difunctional cyanate ester compound of formula (I)

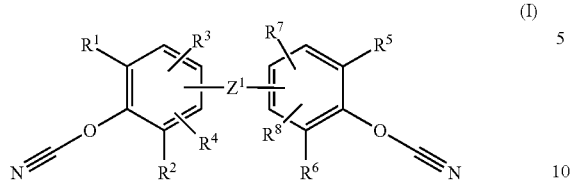

wherein the difunctional cyanate ester of formula I is independently selected from the group consisting of i) $R^1$, $R^2$, $R^5$ and $R^6$ are methyl, $R^3$, $R^4$, $R^7$ and $R^8$ are hydrogen and wherein $Z^1$ is —CH$_2$-(methylene) and oligomers, prepolymers, polymers or mixtures thereof, or ii) $R^1$ through $R^8$ are hydrogen and $Z^1$ is —C(CH$_3$)$_2$— and oligomers, prepolymers, polymers or mixtures thereof, or iii) $R^1$ through $R^8$ are hydrogen and $Z^1$ is —S— and oligomers, prepolymers, polymers or mixtures thereof, or iv) $R^1$ through $R^8$ are hydrogen and $Z^1$ is —C(CF$_3$)$_2$— and oligomers, prepolymers, polymers or mixtures thereof, or v) $R^1$ through $R^8$ are hydrogen and $Z^1$ is —C(=CCl$_2$)— and oligomers, prepolymers, polymers or mixtures thereof, or vi) $R^1$ through $R^8$ are hydrogen and $Z^1$ is independently selected from the group consisting of

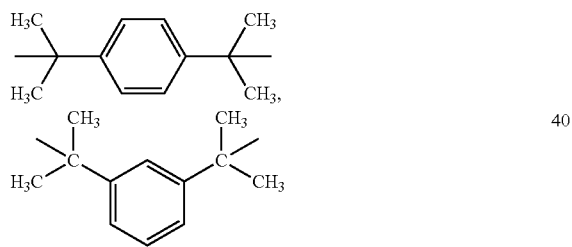

(Primaset® LM-500) and oligomers, prepolymers, polymers or mixtures thereof, or vii) $R^1$ through $R^8$ are hydrogen and $Z^1$ is

(Primaset® DT-4000) and oligomers, prepolymers, polymers or mixtures thereof, or viii) $R^1$ through $R^8$ are hydrogen and $Z^1$ is —CH(CH$_3$)— and oligomers, prepolymers, polymers or mixtures thereof, and oligomers, prepolymers, polymers or mixtures thereof;

and/or (ii) a polyfunctional cyanate ester of formula (II)

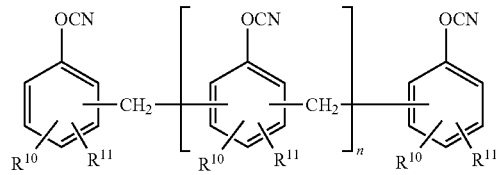

wherein the polyfunctional cyanate ester is independently selected from the group consisting of compound III, compound IV, compound V, compound VI, and oligomers, prepolymers, polymers or mixtures thereof;

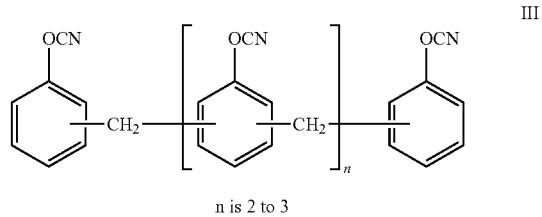

n is 2 to 3

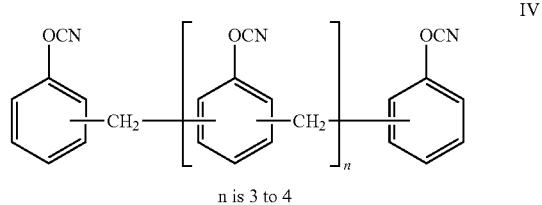

n is 3 to 4

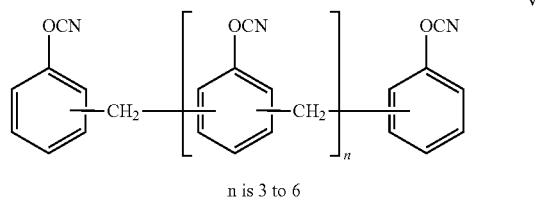

n is 3 to 6

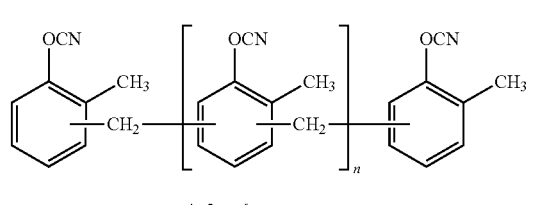

n is 3 to 6 on average and mixtures of cyanate esters of formula (I) and (II);

and wherein component (b) is one or more substituted bisimide independently selected from a biscitraconimide compound of formula (X1),

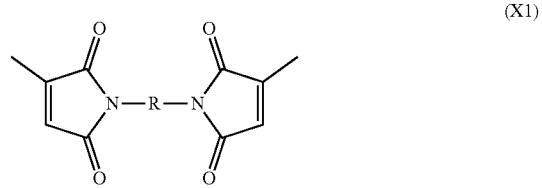

wherein R is selected from o-xylylene, and oligomers, prepolymers, polymers or mixtures thereof, or b1) at least one selected from the group of biscitraconimide compound of formula (X1), bisitaconimide compound of formula (X2) and citraconimido-itaconimide compound of formula (X3), and oligomers, prepolymers, polymers or mixtures thereof,

(X1)

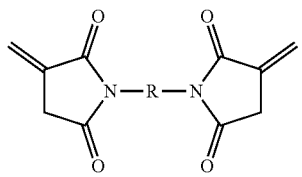
(X2)

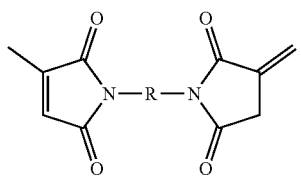
(X3)

or b2) a bisnadicimide compound of formula (X4) and oligomers, prepolymers, polymers or mixtures thereof,

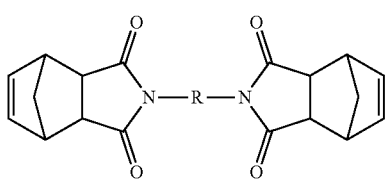
(X4)

or b3) a bistetrahydroimide compound of formula (X5) and oligomers, prepolymers, polymers or mixtures thereof

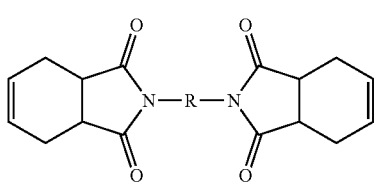
(X5)

wherein R is the moiety <<"N"—R—"N">> which is an aromatic amine moiety independently selected from ("N" denotes the point of connectivity)

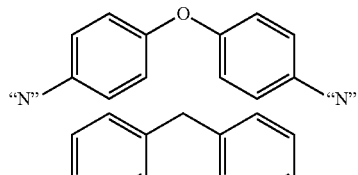

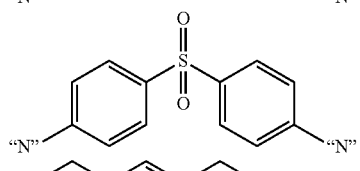

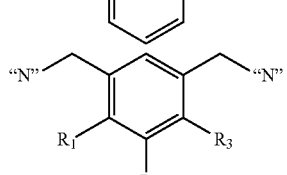

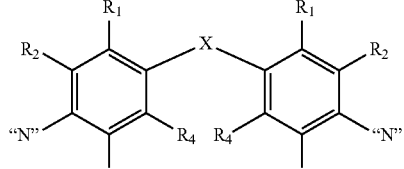

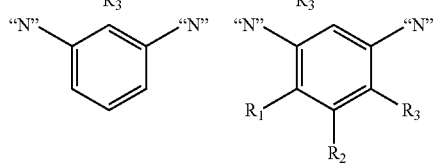

wherein
$R_1$, $R_2$, $R_3$ and $R_4$ are each independently selected from hydrogen, $C_1$-$C_5$ alkyl, halogen (preferably Cl, Br, or F), $NO_2$, and sulfone;
and oligomers, prepolymers, polymers or mixtures thereof.

Another group of compositions according to the invention are those comprising components (a) and (b) wherein component (a) is one or more cyanate esters independently selected from (i) a difunctional cyanate ester compound of formula (I)

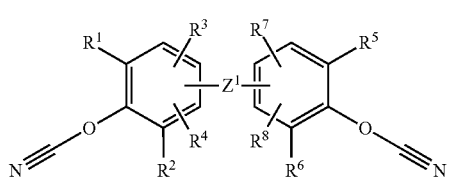
(I)

wherein
the difunctional cyanate ester of formula I is independently selected from the group consisting of
i) $R^1$, $R^2$, $R^5$ and $R^6$ are methyl, $R^3$, $R^4$, $R^7$ and $R^8$ are hydrogen and wherein $Z^1$ is —$CH_2$-(methylene) and oligomers, prepolymers, polymers or mixtures thereof, or ii) $R^1$ through $R^8$ are hydrogen and $Z^1$ is —C(CH$_3$)$_2$— and oligomers, prepolymers, polymers or mixtures thereof, or iii) $R^1$ through $R^8$ are hydrogen and $Z^1$ is —S— and oligomers, prepolymers, polymers or mixtures thereof, or iv) $R^1$ through $R^8$ are hydrogen and $Z^1$ is —C(CF$_3$)$_2$— and oligomers, prepolymers, polymers or mixtures thereof, or v) $R^1$ through $R^8$ are hydrogen and $Z^1$ is —C(=CCl$_2$)— and oligomers, prepolymers, polymers or mixtures thereof, or vi) $R^1$ through $R^8$ are hydrogen and $Z^1$ is independently selected from the group consisting of

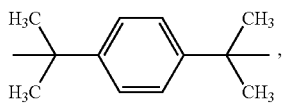

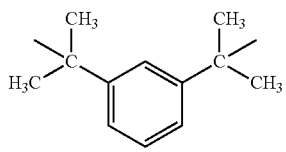

(Primaset® LM-500) and oligomers, prepolymers, polymers or mixtures thereof, or vii) $R^1$ through $R^8$ are hydrogen and $Z^1$ is

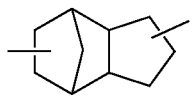

(Primaset® DT-4000) and oligomers, prepolymers, polymers or mixtures thereof, or viii) $R^1$ through $R^8$ are hydrogen and $Z^1$ is —CH(CH$_3$)— and oligomers, prepolymers, polymers or mixtures thereof, or and oligomers, prepolymers, polymers or mixtures thereof;

and/or (ii) a polyfunctional cyanate ester of formula (II)

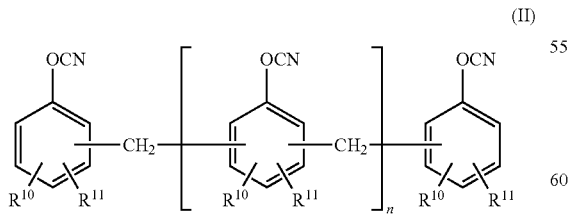

(II)

wherein the polyfunctional cyanate ester is independently selected from the group consisting of compound III, compound IV, compound V, compound VI, and oligomers, prepolymers, polymers or mixtures thereof;

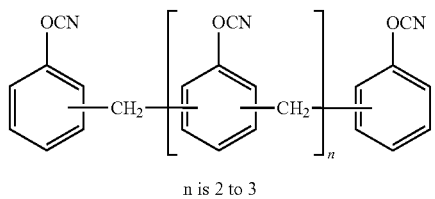

III n is 2 to 3

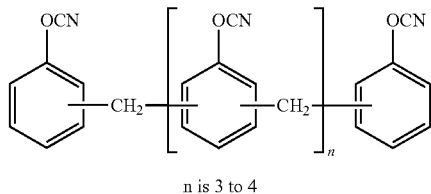

IV n is 3 to 4

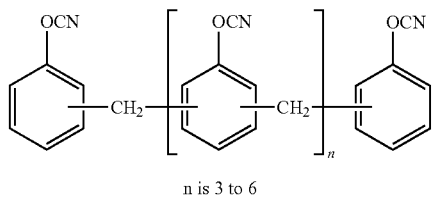

V n is 3 to 6

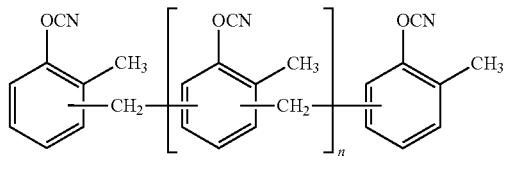

VI n is 3 to 6 on average and mixtures of cyanate esters of formula (I) and (II);

and wherein component (b) is one or more substituted bisimide independently selected from a biscitraconimide compound of formula (X1),

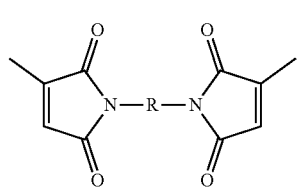

(X1)

wherein R is selected from o-xylylene, and oligomers, prepolymers, polymers or mixtures thereof, or b1) at least one selected from the group of biscitraconimide compound of formula (X1), bisitaconimide compound of formula (X2) and citraconimido-itaconimide compound of formula (X3), and oligomers, prepolymers, polymers or mixtures thereof,

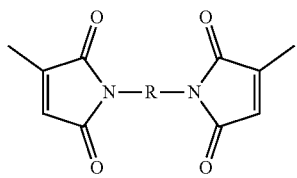
(X1)

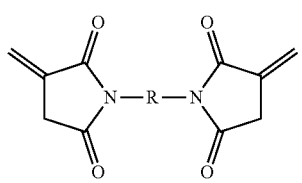
(X2)

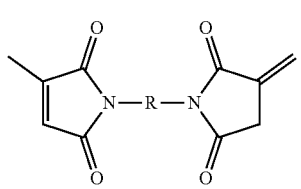
(X3)

or b2) a bisnadicimide compound of formula (X4) and oligomers, prepolymers, polymers or mixtures thereof,

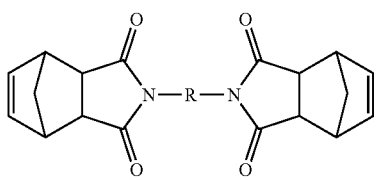
(X4)

or b3) a bistetrahydroimide compound of formula (X5) and oligomers, prepolymers, polymers or mixtures thereof

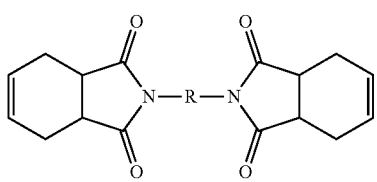
(X5)

wherein R is independently selected from 4,4'-methylene diphenylene, o-phenylene, and o-xylylene, and oligomers, prepolymers, polymers or mixtures thereof.

Another group of compositions according to the invention are those comprising components (a) and (b) wherein component (a) is one or more cyanate esters independently selected from (i) a difunctional cyanate ester compound of formula (I)

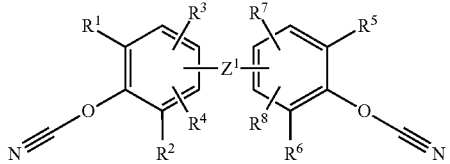
(I)

wherein $R^1$ through $R^8$ are hydrogen and $Z^1$ is —CH(CH$_3$)— and oligomers, prepolymers, polymers or mixtures thereof;

and/or (ii) a polyfunctional cyanate ester of formula (II)

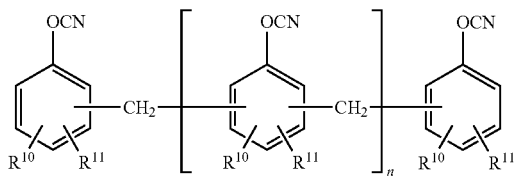
(II)

wherein the polyfunctional cyanate ester is independently selected from the group consisting of compound III, compound IV, compound V, and oligomers, prepolymers, polymers or mixtures thereof;

and mixtures of cyanate esters of formula (I) and (II);

and wherein component (b) is a substituted bisimide compound selected from a biscitraconimide compound of formula (X1)

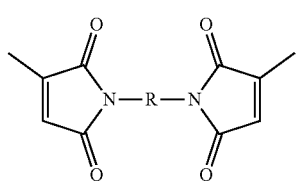
(X1)

wherein R is selected from o-xylylene, and oligomers, prepolymers, polymers or mixtures thereof.

Preparation of Compositions According to the Invention

The present invention relates to novel compositions comprising cyanate ester resins and substituted bisimides (citraconimides, bisitaconimide, citraconimido-itaconimide, bisnadicimide, bistetrahydroimide and mixtures thereof), and thermoset composite materials based on these compositions.

The preparation of a viscous liquid mixture of cyanate esters of component (a) and substituted bisimides of the compounds of component (b) can be achieved, inter alia, by intimately mixing the components together in their liquid states (i.e. at the necessary temperature) until a homogenization is obtained. It is also possible to produce the mixture of the components at lower temperatures by means of the use of solvents.

The preparations of the cyanate esters of component (a) are described in, inter alia, CA2464339A1 U.S. Pat. Nos. 3,553,244, 3,755,402, 3,740,348 and 4,578,439 and EP1190184 EP1195764, U.S. Pat. No. 9,263,360, EP 327926 or can be prepared by analogous procedures described therein or using standard synthesis techniques known to the person skilled in the art. Additionally, many of the cyanate esters of component (a) are also commercially available (e.g. under the brand name Primaset from Lonza, Switzerland).

The preparations of the compounds of component (b) are described in, inter alia, US20120049106, U.S. Pat. No. 7,271,227B1, U.S. Pat. Nos. 5,198,515 and 4,568,733, RSC Adv., 2017, 7, 23149 or can be prepared by analogous procedures described therein or using standard synthesis techniques known to the person skilled in the art. Additionally, many of the compounds of component (b) are also commercially available (e.g. from, amongst others, HOS Technik and Lanxess). Homide 400 is commercially available from, amongst others, HOS and 1,3-bis(citraconimidomethyl)benzene (CAS-RN 73046-18-1, also called 1,3-Bis((3-methyl-2,5-dioxopyrrol-1-yl)methyl)benzol) is commercially available, amongst others, from Lanxess (available as Perkalink®900).

The viscous liquid mixture can be used as a stand-alone thermoset resin for casting process, adhesives, insulation films or, alternatively, it can be used in combination with fibres and fabric for the production of fibre-reinforced parts. For the production of fiber-reinforced parts, there are several established, well known, methods that can be applied such as traditional pre-preg (hot melt and solvated), resin infusion, resin injection, filament winding, pultrusion, hand-laminating and compression molding.

Preparation of Thermoset Composite Materials According to the Invention

Preparation of the thermoset composite materials according to the invention can be achieved as follows: providing a viscous liquid mixture of cyanate esters of component (a) and substituted bisimides compounds of component (b) as described above, casting the mixture into the desired form, and then initiating polymerization of the mixture (e.g. by, inter alia, increasing temperature, use of a catalyst as described above and below, or other methods commonly known in the art).

Additionally, as described above and below, the mixture may further comprise a catalyst and/or further components selected from fibres, fillers, pigments and/or additives that may be desired or useful for the resin casting process and/or the preparation of adhesives and insulation films. The inclusion of these optional components is achieved by adding them to the mixture in the process described above.

In one embodiment, the method for the preparation of a thermoset composite part produced according to the invention comprises:
(i) mixing the cyanate ester of component (a) and the substituted bisimides compounds of component (b) to obtain a homogenous mixture;
   a. optionally, a catalyst and a solvent may be added to the mixture composition;
(ii) providing a fiber structure;
(iii) placing said fiber structure in a mold or on a substrate;
(iv) impregnating said fiber structure with said mixture (from step (i)), optionally by applying elevated pressure and/or evacuating the air and solvent from the mold and fiber structure, preferably at a temperature of 50 to 150° C.; and
   curing said liquid mixture in cured laminates by applying a temperature of preferably 50 to 200° C. with heating steps for a time sufficient to achieve a degree of conversion that allows de-moulding of the parts. A post-cure step can directly follow the cure cycle and/or be applied once the part is removed from the mold (freestanding). Preferably a post-cure is be applied freestanding by applying a temperature of 200 to 300° C. to achieve very high degree of conversion and, respectively, an optimal thermal resistance.

In another embodiment, the impregnation in step (iv) is achieved using a method selected from the group consisting of pre-preg (hot melt and solvated), resin transfer molding, vacuum assisted resin transfer molding, Vacuum resin infusion, Seemann Composites Resin Infusion Molding Process, injection molding, compression molding, spray molding, pultrusion, hand laminating, filament winding, Quickstep process or Roctool process.

In another embodiment, the impregnation in step (iv) is achieved using a composite molding process method selected from the group consisting of pre-preg (hot melt and solvated), resin transfer molding, liquid resin infusion, Seemann Composites Resin Infusion Molding Process, vacumn assisted resin infusion, injection molding, BMC/SMC bulk and sheet molding compounds and EADS vacuum assisted process (VAP®).

The mixture of cyanate esters of component (a) and substituted bisimides of the compounds of component (b) can optionally be formulated with at least one di- or polyfunctional epoxy resin selected from the group consisting of bisphenol A diglycidyl ether resins, bisphenol F diglycidyl ether resins, N,N,O-triglycidyl-3-aminophenol, N,N,O-triglycidyl-4-aminophenol, N,N,N',N'-tetraglycidyl-4,4'-methylenebisbenzenamine, 4,4',4''-methylidenetrisphenol triglycidyl ether resins, naphthalenediol diglycidyl ethers, and mixtures thereof.

The mixture of cyanate esters of component (a) and substituted bisimides of the compounds of component (b) can optionally be formulated with at least one bismaleimide compounds known to the skilled person and is selected from the group consisting of for examples 2,2'-bis(4-(4-maleimidophenoxy)-phenyl)propane, bis(3-ethyl-5-methyl-4-maleimidophenyl)methane and mixtures thereof as disclosed in WO2018/139368.

The mixture of cyanate esters of component (a) and substituted bisimides of the compounds of component (b) can optionally be formulated with at least one benzoxazines compounds known to the skilled person and is selected from the group consisting of for examples bisphenol-A benzoxazine, bisphenol-F benzoxazine, phenolphthaleine (PhPTH) benzoxazine, dicyclopentadiene (DCPD) benzoxazine, thiodiphenol benzoxazine and mixtures thereof.

The mixture of cyanate esters of component (a) and substituted bisimides of the compounds of component (b) can be optionally formulated with at least one unsaturated polyester compounds known to the skilled person and is selected from the group consisting of for examples isophthalic polyester, acrylic based unsaturated polyester, methyl methacrylate (MMA) based unsaturated polyester, butyl methacrylate (BMA) based unsaturated polyester, acrylonitrile (AN) based unsaturated polyester and mixtures thereof.

The mixture of cyanate esters of component (a) and substituted bisimides of the compounds of component (b) can optionally be formulated with at least one vinylester compounds known to the skilled person and is selected from the group consisting of for examples methacrylate vinylester, acrylate vinylester, bisphenol-A epoxy based vinylester, phenolic novolac based vinylester, tetrabromobisphenol A epoxy based vinylester and mixtures thereof.

Further, the mixture of cyanate esters of component (a) and substituted bisimides of the compounds of component (b) optionally can be formulated with at least one reactive modifier which include but are not limited to thermoplastics, small organic molecules, rubbers, and inorganic/organometallic polymers. The reactive groups on the additives include but are not limited to hydroxyl groups, acrylate, methacrylate, phenol groups, thiol groups, epoxy groups, bismaleimide groups, benzoxazin group, amines, thiols, thiophenols, and phosphorous groups.

The compositions according to the invention may optionally further comprise a catalyst to aid the curing process.

Suitable catalysts are selected from the group consisting of aliphatic mono-, di- and polyamines, aromatic mono-, di- and polyamines, carbocyclic mono-, di and polyamines, heterocyclic mono-, di- and polyamines, compounds containing a five- or six-membered nitrogen-containing heterocyclic ring, hydroxyamines, phosphines, phenols, and mixtures thereof Besides, the resin composition of the present embodiment may optionally contain a curing accelerator for appropriately controlling a curing rate if necessary. Any of those generally used as a curing accelerator catalyst for a cyanate and the bismalimide ester compound, an epoxy resin and the like can be suitably used as the curing accelerator, and the type is not especially limited. Specific examples of the curing accelerator include organic metal salts such as zinc octylate, zinc naphthenate, cobalt naphthenate, copper naphthenate, iron acetylacetonate, nickel octylate and manganese octylate; phenolic compounds such as phenol, xylenol, cresol, resorcin, catechol, octylphenol and nonylphenol; alcohols such as 1-butanol and 2-ethylhexanol; imidazoles such as 2-phenylimidazole, 4-phenylimidazole, 1-phenylimidazole, 2-methylimidazole, 2-ethyl-4-methylimidazole, 1-cyanoethyl-2-phenylimidazole, 1-cyanoethyl-2-ethyl-4-methylimidazole, 2-phenyl-4,5-dihydroxymethylimidazole and 2-phenyl-4-methyl-5-hydroxymethylimidazole, and derivatives of these imidazoles such as carboxylic acid or anhydride adducts thereof, amines such as dicyandiamide, benzyldimethylamine and 4-methyl-N,N-dimethylbenzylamine; phosphorus compounds such as phosphine-based compounds, phosphine oxide-based compounds, phosphonium salt-based compounds and diphosphine compounds; epoxyimidazole adduct-based compounds; peroxides such as benzoyl peroxide, p-chlorobenzoyl peroxide, di-t-butyl peroxide, diisopropyl peroxycarbonate and di-2-ethylhexyl peroxycarbonate 2,5-Dimethyl-2,5-di(tert-butylperoxy) hexyne-3 (Trigonox 145-E85 manufactured by Nouryon); and azo compounds such as azobisisobutyronitrile. Many curing accelerators (a polymerization catalyst) are commercially available, such as Amicure PN-23 (product name, manufactured and available from Ajinomoto Fine-Techno Co., Inc.), Novacure HX-3721 (product name, manufactured and available from Asahi Kasei Advance Corporation) and Fujicure FX-1000 (product name, manufactured and available from Fuji Kasei Co., Ltd.).

In one embodiment the catalyst is selected from the group consisting of aromatic diamine curing catalysts, transition metal salt catalysts, peroxide catalysts, imidazoles catalysts, or 1,4-Diazabicyclo[2.2.2]octane (DABCO), and mixtures thereof, as defined directly below.

The aromatic diamine curing catalyst is selected from the group consisting of aromatic diamines of formula VIIa and VIIb

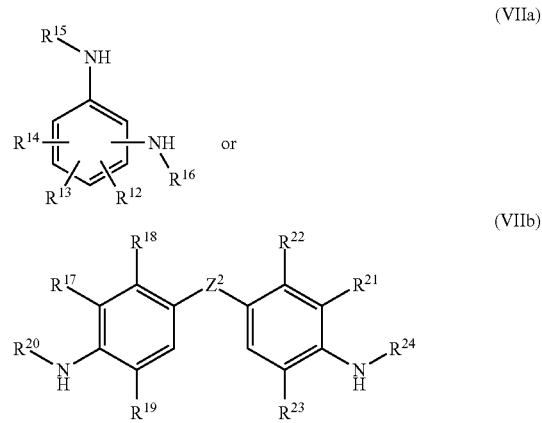

wherein
$R^{12}$, $R^{13}$, $R^{14}$, $R^{17}$, $R^{16}$, $R^{18}$, $R^{19}$, $R^{21}$, $R^{22}$ and $R^{23}$ are independently selected from hydrogen, $C_{1-4}$ alkyl, $C_{1-4}$ alkoxy, $C_{1-4}$ alkylthio and chlorine;
$R^{15}$, $R^{16}$, $R^{20}$ and $R^{24}$ are independently selected from hydrogen and $C_{1-8}$ alkyl; and
$Z^2$ indicates a direct bond or a divalent moiety selected from the group consisting of —O—, —S—, —S(=O)—, —S(=O)$_2$—, —CH$_2$—, —CH(CH$_3$)—, —C(CH$_3$)$_2$—, —CH(CF$_3$)—, —C(CF$_3$)$_2$—, —C(=O)—, —C(=CH$_2$)—, —C(=CCl$_2$)—, —Si(CH$_3$)$_2$—, linear $C_{1-10}$ alkanediyl, branched $C_{4-10}$ alkanediyl, $C_{3-8}$ cycloalkanediyl, 1,2-phenylene, 1,3-phenylene, 1,4-phenylene, —N(R$^{25}$)— wherein R$^{25}$ is selected from the group consisting of hydrogen, linear $C_{1-10}$ alkyl, halogenated linear $C_{1-10}$ alkyl, branched $C_{4-10}$ alkyl, halogenated branched $C_{4-10}$ alkyl, $C_{3-8}$ cycloalkyl, phenyl and phenoxy.

The expression "$C_{1-4}$ alkyl" is herein meant to include methyl, ethyl, 1-propyl, 2-propyl (isopropyl), 1-butyl, 2-butyl (sec-butyl), 2-methyl-1-propyl (isobutyl) and 2-methyl-2-propyl (tert-butyl) while the expression "$C_{1-8}$ alkyl" is meant to include the before mentioned and all linear and branched alkyl groups having 5 to 8 carbon atoms according to the definitions given above for linear $C_{1-10}$ alkyl and branched $C_{4-10}$ alkyl.

Preferably, $R^{12}$, $R^{13}$, $R^{14}$, $R^{17}$, $R^{16}$, $R^{18}$, $R^{19}$, $R^{21}$, $R^{22}$ and $R^{23}$ are independently selected from hydrogen, $C_{1-4}$ alkyl, and $C_{1-4}$ alkoxy;
$R^{15}$, $R^{16}$, $R^{20}$ and $R^{24}$ are independently selected from hydrogen and $C_{1-4}$ alkyl; and
$Z^2$ is a methylene (—CH$_2$—) group.

The transition metal salt catalyst is preferably selected from the group consisting of aluminum(III) acetylacetonate, manganese (II) acetylacetonate, zinc(II) acetylacetonate, cobalt (II) acetylacetonate, cobalt (III) acetylacetonate, copper (II) acetylacetonate, iron (III) acetylacetonate, and mixtures thereof.

The peroxide catalyst is preferably benzoyl peroxide, p-chlorobenzoyl peroxide, di-t-butyl peroxide, diisopropyl peroxycarbonate and di-2-ethylhexyl peroxycarbonate or 2,5-Dimethyl-2,5-di(tert-butylperoxy) hexyne-3 (Trigonox 145-E85 manufactured by Nouryon).

The imidazoles catalyst is preferably 2-phenylimidazole, 4-phenylimidazole, 1-phenylimidazole, 2-methylimidazole, 2-ethyl-4-methylimidazole, 1-cyanoethyl-2-phenylimidazole, 1-cyanoethyl-2-ethyl-4-methylimidazole, 2-phenyl-4,5-dihydroxymethylimidazole and 2-phenyl-4-methyl-5-hydroxymethylimidazole.

Alternatively, the catalyst is preferably 1,4-Diazabicyclo[2.2.2]octane (DABCO).

More preferably, the catalyst is selected from the group consisting of aromatic diamine curing catalysts, transition metal salt catalysts, peroxide catalysts, imidazoles catalysts, or 1,4-Diazabicyclo[2.2.2]octane (DABCO), and mixtures thereof, as defined directly below.

More preferably, the aromatic diamine curing catalyst is selected from the group consisting of 3,5-diethyltoluene-2,4-diamine, 3,5-diethyltoluene-2,6-diamine, 4,4'-methylene-bis(2,6-diisopropylaniline), 4,4'-methylene-bis(2-isopropyl-6-methylaniline), 4,4'-methylene-bis(2,6-diethylaniline) (M-DEA), 4,4'-methylene-bis(3-chloro-2,6-diethylaniline) (M-CDEA), 4,4'-methylene-bis(2-ethyl-6-methylaniline), 4,4'-methylene-bis(N-sec-butylaniline), dimethylthiotoluenediamine (DMTDA), and mixtures thereof.

The transition metal salt catalyst is selected from the group consisting of aluminum(III) acetylacetonate, manganese (II) acetylacetonate, zinc(II) acetylacetonate, cobalt (II) acetylacetonate, cobalt (III) acetylacetonate, copper (II) acetylacetonate, iron (III) acetylacetonate, and mixtures thereof.

The peroxide catalyst is more preferably benzoyl peroxide, p-chlorobenzoyl peroxide, di-t-butyl peroxide, diisopropyl peroxycarbonate and di-2-ethylhexyl peroxycarbonate or 2,5-dimethyl-2,5-di(tert-butylperoxy) hexyne-3 (Trigonox 145-E85 manufactured by Nouryon).

The imidazoles catalyst is more preferably 2-phenylimidazole, 4-phenylimidazole, 1-phenylimidazole, 2-methylimidazole, 2-ethyl-4-methylimidazole.

Alternatively, the catalyst is more preferably 1,4-Diazabicyclo[2.2.2]octane (DABCO).

In one embodiment the catalyst is selected from the group consisting of aromatic diamine curing catalysts, transition metal salt catalysts, peroxide catalysts, imidazoles catalysts, or 1,4-Diazabicyclo[2.2.2]octane (DABCO), and mixtures thereof, as defined directly below.

In one embodiment the aromatic diamine curing catalyst is selected from the group consisting of 3,5-diethyltoluene-2,4-diamine, 3,5-diethyltoluene-2,6-diamine, 4,4'-methylene-bis(2,6-diisopropylaniline), 4,4'-methylene-bis(2-isopropyl-6-methylaniline), 4,4'-methylene-bis(2,6-diethylaniline) (M-DEA), 4,4'-methylene-bis(3-chloro-2,6-diethylaniline) (M-CDEA), 4,4'-methylene-bis(2-ethyl-6-methylaniline), 4,4'-methylene-bis(N-sec-butylaniline), and mixtures thereof.

The transition metal salt catalyst is most preferably selected from the group consisting of aluminum (III) acetylacetonate, manganese (II) acetylacetonate, zinc(II) acetylacetonate, cobalt (II) acetylacetonate, cobalt (III) acetylacetonate, copper (II) acetylacetonate, iron (III) acetylacetonate, and mixtures thereof. Especially most preferably the transition metal salt catalyst is aluminum (III) acetylacetonate.

The peroxide catalyst is more preferably benzoyl peroxide, di-t-butyl peroxide, diisopropyl peroxycarbonate and di-2-ethylhexyl peroxycarbonate or 2,5-dimethyl-2,5-di(tert-butylperoxy) hexyne-3 (Trigonox 145-E85 manufactured by Nouryon).

The imidazoles catalyst is more preferably 2-phenylimidazole, 4-phenylimidazole, or 1-phenylimidazole.

Alternatively, the catalyst is more preferably 1,4-Diazabicyclo[2.2.2]octane (DABCO).

It has been found that the above catalysts act as curing catalysts when used in in the compositions according to the invention.

The amount of the curing catalyst can be varied to adapt to different applications and needs. Typically, the amount of the catalyst ranges from 0.05 to 10.0 wt %, more preferably from 0.1 to 5 wt %, even more preferably from 0.15 to 2 wt % based on the total amount of cyanate ester bisimides mixture The compositions according to the invention may optionally further comprise reinforcement fibres to improve the mechanical performance of the final resultant composite materials.

Suitable reinforcement fibres are known in the art, and may be selected from materials such as carbon fibres, glass fibres (such as E glass fibres, S glass fibres), aramid fibres (including KEVLAR®), basalt fibres (geotextile fibers), natural fibres (such as flax, hemp, jute or sisal), fleeces and woven fabrics (multi-layered or single layered).

Mixtures of two or more reinforcement fibres can also be applied.

In one embodiment the reinforcement fibres are carbon fibres such as polyacrylonitrile PAN based carbon fibres, glass fibres, basalt fibres, aramid fibres or natural fibres, or mixtures thereof.

In another embodiment the reinforcement fibres are glass fibres, carbon fibres or aramid fibres, or mixtures thereof.

The reinforcement fibres may be pre-shaped fibres. The reinforcement fibres may be chopped or continuous, random or oriented, woven or non-woven, knitted or non-knitted or braided according to the requirements of any of various different portions of the desired structure of the moulded composite or fibre reinforced part.

The pre-shaped form of the reinforcement fibres may be selected in view of the desired form of the moulding composite (also called reinforced part), the fibre may have the form of a sheet, mat, bead, strand, thread, band, web, roving, band of rovings, bundle, or the like.

The amount of reinforcement fibres may vary depending on the desired thermoset composite.

The compositions according to the invention may optionally further comprise a filler.

Suitable fillers known to the person skilled in the art are for example organic, such as thermoplastics and elastomers, or inorganic, such as glass microspheres, graphite or silica.

Further suitable fillers known in the art are for example mineral powders, such as for example $CaCO_3$, coated $CaCO_3$, kaolin clay, $SiO_2$, talc, graphite, corundum ($\alpha$-$Al_2O_3$), SiC, glass microspheres, mica, calcium silicate ($Ca_2O_4Si$), wollastonite, MgO, anhydrous calcium sulfate ($CaSO_4$ or anhydrite), ceramic hollow microspheres, fused mullite ($Al_2O_3$—$SiO_2$), boron nitride (BN), vermiculite, or basalt. Mixtures of the above fillers can also be used.

In one embodiment, the filler to be used in the invention is independently selected from the group consisting of $CaCO_3$, coated $CaCO_3$, kaolin clay, $SiO_2$, talc, graphite, corundum ($\alpha$-$Al_2O_3$), SiC, glass microspheres, mica, calcium silicate ($Ca_2O_4Si$), wollastonite, MgO, anhydrous calcium sulfate ($CaSO_4$ or anhydrite), ceramic hollow microspheres, fused mullite ($Al_2O_3$—$SiO_2$), boron nitride (BN), vermiculite, basalt, and mixtures thereof.

In another embodiment, the filler is independently selected from the group consisting of $CaCO_3$, coated $CaCO_3$, kaolin clay, $SiO_2$, wollastonite, talc, and mixtures thereof.

In another embodiment, the filler is independently selected from the group consisting of coated $CaCO_3$, Talc, and mixtures thereof.

The fillers may be in particle, powder, sphere, chip and/or strand form and have an average particle size from nano scale to millimeters, preferably the fillers have an average particle size from 0.1 to 1000 µm, more preferably the fillers have an average particle size of from 0.5 to 500 µm.

The amount of fillers may vary and is preferably from 5 to 60 wt %, preferably from 15 to 50 wt %, more preferably from 15 to 45 wt %, based on the total weight of the thermoset composite.

EXAMPLES

Abbreviations

| | |
|---|---|
| TMA | Thermal mechanical analysis |
| MSDS | Material Safety Data Sheet |
| RT | Room temperature |
| Tg | Glass transition temperature |

| | |
|---|---|
| BMI-5100 | Bismaleimide from Dawei Kasei JP, CAS NO: 105391-33-1, 3,3'-dimethyl-5,5'-diethyl-4,4'-diphenylmethane bismaleimide |
| BMI-2300 | Phenylmethane maleimide from Dawei Kasei JP, CAS NO: 67784-74-1 |
| Perkalink ® 900 | 1,3-bis(citraconimidomethyl)benzene, from Lanxess |
| Homide 400 | 1,3-Bis((3-methyl-2,5-dioxopyrrol-1-yl)methyl)benzol, homide 400 oligomer: 1,3-Bis((3-methyl-2,5-dioxopyrrol-1-yl)methyl)benzol, polymer, or mixtures of homide 400 monomer and homide 400 oligomer from HOS Technik |
| Cyanate ester III | compound of formula III of Lonza Ltd, Switzerland, CAS NO: 87397-54-4, also the following CAS-number are applicable: CAS 153191-90-3, CAS 173452-35-2 |
| Cyanate ester LeCy | Primaset ® LeCy of Lonza Ltd, Switzerland, CAS NO: 47073-92-7 |

Experimental Procedure for Examples 1 and 2

A cyanate ester was heated at 85-90° C. in order to decrease its viscosity and was casted into two aluminum pans with diameter of 5 cm containing each 6 g of the cyanate ester. The cyanate ester was cured and post-cured using the following cure cycle:
Cure cycle: heat-up from 25° C. to 150° C. at 1K/min, hold 1 h at 150° C.
  heat-up from 150° C. to 200° C. at 1K/min, hold 3 h at 200° C.
  heat-up from 200° C. to 260° C. at 1K/min, hold 1 h at 260° C.

The cured cyanate ester is cooled to RT and was removed from the aluminum pan (de-molded). The cured material was evaluated in term of mass loss (thermal-oxidative stability) and glass transition temperature.

The cured material had the following dimensions: diameter=5 cm, thickness=2 cm

The components and their amounts in gram (g) and wt % (% based on the total weight of the mixture) are given in table 1 (g) and table 2 (wt %).

Experimental Procedure for Examples 3, 5 and 6

A substituted bisimide was liquefied at 130-140° C. and casted into two aluminum pans with diameter of 5 cm containing each 6 g of substituted bisimide. The bisimide was placed inside a vacuum oven at 120-125° C. and degassed at less than 100 mbar vacuum pressure for 10-15 min to remove any air present in the bisimide. The substituted bisimide was cured and post-cured using the following cure cycle:
Cure cycle: heat-up from 25° C. to 175° C. at 1K/min, hold 3 h at 175° C.
  heat-up from 175° C. to 220° C. at 1K/min, hold 2 h at 220° C.
  heat-up from 220° C. to 260° C. at 1K/min, hold 16 h at 260° C.

The cured substituted bisimide is cooled to RT and was removed from the aluminum pan (de-molded). The cured material was evaluated in term of mass loss (thermal-oxidative stability) and glass transition temperature.

The cured material had the following dimensions: diameter=5 cm, thickness=2 cm The components and their amounts in gram (g) and wt % (% based on the total weight of the mixture) are given in table 1 (g) and table 2 (wt %).

Experimental Procedure for Examples 7, 8, 9 and 10

A cyanate ester and a substituted bisimide are mixed at 130-135° C. till complete homogenization and poured into two aluminum pans with diameter of 5 cm containing each 6 g of said mixtures. The mixture was then placed inside a vacuum oven at 120-125° C. and degassed at less than 100 mbar vacuum pressure for 10-15 min to remove any air bubbles present in the mixture. The mixture was then cured and post-cured using the following cure cycle:
Cure cycle: heat-up from 25° C. to 175° C. at 1K/min, hold 3 h at 175° C.
  heat-up from 175° C. to 220° C. at 1K/min, hold 2 h at 220° C.
  heat-up from 220° C. to 260° C. at 1K/min, hold 16 h at 260° C.

The cured "cyanate ester—bisimide mixture" is cooled to RT and was removed from the aluminum pan (de-molded). The cured material was evaluated in term of mass loss (thermal-oxidative stability) and glass transition temperature.

The cured material had the following dimensions: diameter=5 cm, thickness=2 cm

The components and their amounts in gram (g) and wt % (% based on the total weight of the mixture) are given in table 1 (g) and table 2 (wt %).

TABLE 1 the components and their amounts in gram (g) for example 1 to 10

| Example | 1 | 2 | 3 | 5 | 6 | 7 | 8 | 9 | 10 |
|---|---|---|---|---|---|---|---|---|---|
| Cyanate ester III | 15 | | | | | 10 | 14 | 8 | 12 |
| Primaset ® LeCy | | 15 | | | | | | 4 | 4 |
| Homide 400 | | | 15 | | | 10 | 6 | 8 | 4 |
| BMI-2300 | | | | 15 | | | | | |
| BMI-5100 | | | | | 15 | | | | |
| Total gram | 15 | 15 | 15 | 15 | 15 | 20 | 20 | 20 | 20 |

TABLE 2 the components and their amounts in wt % based on the total weight of the mixture for example 1 to 10

| Example | 1 | 2 | 3 | 5 | 6 | 7 | 8 | 9 | 10 |
|---|---|---|---|---|---|---|---|---|---|
| Cyanate ester III | 100 | | | | | 50 | 70 | 40 | 60 |
| Primaset ® LeCy | | 100 | | | | | | 20 | 20 |
| Homide 400 | | | 100 | | | 50 | 30 | 40 | 20 |
| BMI-2300 | | | | 100 | | | | | |
| BMI-5100 | | | | | 100 | | | | |
| Example | 1 | 2 | 3 | 5 | 6 | 7 | 8 | 9 | 10 |
| Total wt % | 100 | 100 | 100 | 100 | 100 | 100 | 100 | 100 | 100 |

Experimental Procedure for Testing of Cured Materials for Examples 1 to 10

The thermal oxidative stability of above cured samples is evaluated based upon weight loss during isothermal aging at 250° C. and the material surface damage detected visually. The cured sample (diameter 5 cm and thickness of 2 cm) was placed in an oven at 250° C. for a long term aging test. The initial weight ($w_0$) of the cured sample was measured with an analytical balance resolution of at least 0.1 mg before starting aging test. Then the sample weight was re-measured ($w_{xhours}$) after different thermal aging periods at 250° C. The correspondent mass loss in % was calculated using the following formula:

Mass Loss [%] = (($w_0 - w_{xhours}$)/$w_0$) × 100

The sample was then re-placed in the oven at 250° C. for aging test. The result are given in table 3. The cured samples were further examined visually to detect any damage, results are given in table 4.

Samples of the cured composition were cut to specimens and the glass transition temperature (Tg) was analysed by Thermal Mechanical Analysis (TMA) and the results are given in table 3.

Glass transition temperature is the temperature, at which the physical properties of a polymeric materials change from amorphous rigid, glassy or crystalline state to a flexible rubbery state. The machine used was a Mettler Toledo instrument TMA SDTA840. The sample dimensions were 6×6 mm2 (length×width) and 2.0 mm thickness. The test method applied two heating ramps ($1^{st}$ heat-up: 25-250° C. at 10 K/min, $2^{nd}$ heat-up: 25-400° C. at 10 K/min). The Tg was evaluated on the second ramp. The result are given in Table 3.

TABLE 3

Mass loss and Tg onset for examples 1 to 10

| Example | mass loss 500 h at 250° C. [%] | mass loss 1000 h at 250° C. [%] | mass loss 3000 h at 250° C. [%] | $T_g$ onset by TMA [° C.] |
|---|---|---|---|---|
| 1 | 1.28 | 2.31 | 6.99 | ~350 |
| 2 | **NR | 3.85 | 31.19 | 250-260 |
| 3 | 0.98 | 1.48 | 2.66 | 235-245 |
| 5 | 5.2 | 18.81 | **NR | >300 |
| 6 | 19.52 | 35.86 | **NR | >300 |
| *7 | **NR | 1.66 | 3.89 | 260-270 |
| *8 | **NR | 1.97 | 5.16 | 275-285 |
| *9 | **NR | 1.60 | 5.70 | 255-265 |
| *10 | **NR | 2.14 | 8.46 | 270-280 |

**NR = not recorded

TABLE 4

Material damage detection by visual examination after 1000 hours aging at 250° C. for examples 1 to 10

| Example | Visual appearance after 1000 hours aging at 250° C. |
|---|---|
| 1 | Scattered microcracking formation |
| 2 | Remarkable material shrinkage/deformation |
| 3 | No cracking occurred |
| 5 | Surface decomposition, crumbled and void formation |
| 6 | Material sintered |
| *7 | No cracking occurred, surface smooth |
| *8 | No cracking occurred, surface smooth |
| *9 | No cracking occurred, surface smooth |
| *10 | Scattered microcracking formation |

What is claimed is:

1. A composition comprising components (a) and (b) wherein component (a) is one or more cyanate esters independently selected from
   (i) a difunctional cyanate ester compound of formula (I)

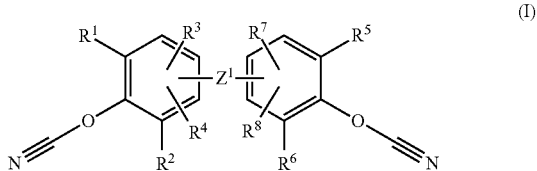

wherein
$R^1$ through $R^8$ are independently selected from the group consisting of hydrogen, linear $C_{1-10}$ alkyl, halogenated linear $C_{1-10}$ alkyl, branched $C_{4-10}$ alkyl, halogenated branched $C_{4-10}$ alkyl, $C_{3-8}$ cycloalkyl, halogenated $C_{3-8}$ cycloalkyl, $C_{1-10}$ alkoxy, halogen, phenyl and phenoxy;
$Z^1$ indicates a direct bond or a divalent moiety selected from the group consisting of —O—, —S—, —S(=O)—, —S(=O)$_2$—, —CH$_2$—, —CH(CH$_3$)—, —C(CH$_3$)$_2$—, —CH(CF$_3$)—, —C(CF$_3$)$_2$—, —C(=O)—, —C(=CH$_2$)—, —C(=CCl$_2$)—, —Si(CH$_3$)$_2$—, linear $C_{1-10}$ alkanediyl, branched $C_{4-10}$ alkanediyl, $C_{3-8}$ cycloalkanediyl, 1,2-phenylene, 1,3-phenylene, 1,4-phenylene, —N(R$^{13}$)— wherein R$^{13}$ is selected from the group consisting of hydrogen, linear $C_{1-10}$ alkyl, halogenated linear $C_{1-10}$ alkyl, branched $C_{4-10}$ alkyl, halogenated branched $C_{4-10}$ alkyl, $C_{3-8}$ cycloalkyl, phenyl and phenoxy, and moieties of formulas

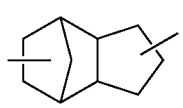 and 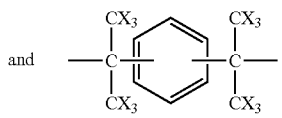

wherein X is independently selected from hydrogen and halogen;

and oligomers, prepolymers, polymers or mixtures thereof;

and (ii) a polyfunctional cyanate ester of formula (II)

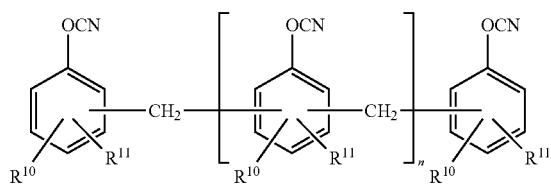

(II)

wherein n is an integer from 1 to 20; and $R^{10}$ and $R^{11}$ are identical or different and independently from each other selected from the group consisting of hydrogen, linear $C_{1-10}$ alkyl and branched $C_{4-10}$ alkyl;

and oligomers, prepolymers, polymers or mixtures thereof;

and wherein component (b) is one or more substituted bisimide compound independently selected from a compound of formula (X)

X wherein * and ** each denotes a covalent bond to the respective C atom denoted with * and of a residue, wherein the residues are identical or different and independently selected from

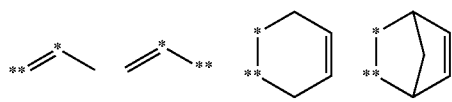

and wherein R is independently selected from $C_{7-8}$ cycloalkyl, $C_{2-10}$ alkyne or the moiety <<"N"—R—"N">>, wherein "N" denotes the point of connectivity and <<"N"—R—"N">> is an aromatic amine moiety independently selected from

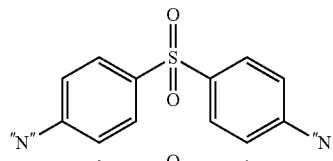

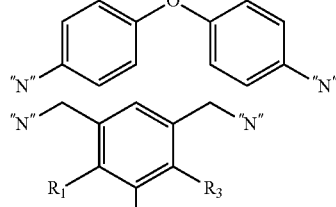

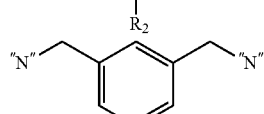

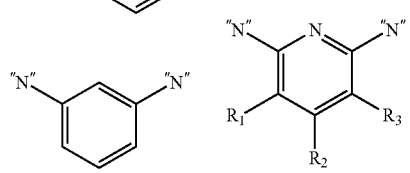

wherein

"N" corresponds to N in formula (X), and $R_1$, $R_2$, and $R_3$ are each independently selected from hydrogen, $C_2$-$C_{20}$ alkyl, $C_2$-$C_{20}$ alkene, $C_2$-$C_{20}$ alkyne, halogen, $NO_2$, and sulfone, wherein the halogen is selected from Cl, Br, F, or I;

and oligomers, prepolymers, polymers or mixtures of these compounds.

2. A composition according to claim 1 wherein component (a) is one or more cyanate esters independently selected from (i) a difunctional cyanate ester compound of formula (I)

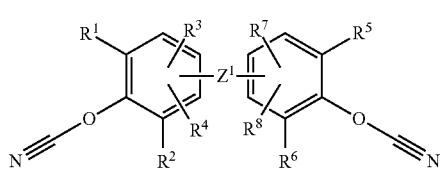

(I)

wherein $R^1$ through $R^8$ are independently selected from the group consisting of hydrogen, linear $C_{1-10}$ alkyl, $C_{3-8}$ cycloalkyl;

$Z^1$ indicates a direct bond or a divalent moiety selected from the group consisting of —O—, —S—, —S(=O)—, —S(=O)$_2$—, —CH$_2$—, —CH(CH$_3$)—, —C(CH$_3$)$_2$—, —CH(CF$_3$)—, —C(CF$_3$)$_2$—, —C(=O)—, —C(=CH$_2$)—, —C(=CCl$_2$)—, —Si(CH$_3$)$_2$—, linear $C_{1-10}$ alkanediyl, branched $C_{4-10}$ alkanediyl, $C_{3-8}$ cycloalkanediyl, 1,2-phenylene, 1,3-phenylene, 1,4-phenylene, —N($R^{13}$)— wherein $R^{13}$ is selected from the group consisting of hydrogen, linear $C_{1-10}$ alkyl, $C_{3-8}$ cycloalkyl, phenyl and phenoxy, and moieties of formulas

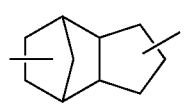 and 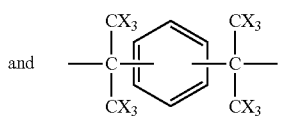

wherein X is independently selected from hydrogen and halogen; and oligomers, prepolymers, polymers or mixtures thereof;
and
(ii) a polyfunctional cyanate ester of formula (II)

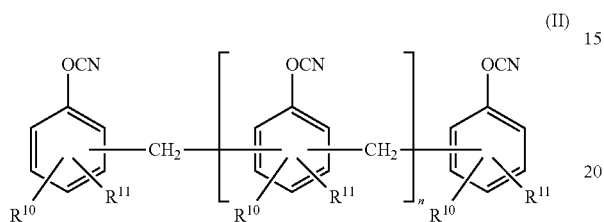

(II)

wherein
n is an integer from 1 to 20; and $R^{10}$ and $R^{11}$ are identical or different and independently from each other selected from the group consisting of hydrogen, linear $C_{1-10}$ alkyl and branched $C_{4-10}$ alkyl; and oligomers, prepolymers, polymers or mixtures thereof.

3. A composition according to claim 1 wherein component (a) is one or more cyanate esters independently selected from
(i) a difunctional cyanate ester compound of formula (I)

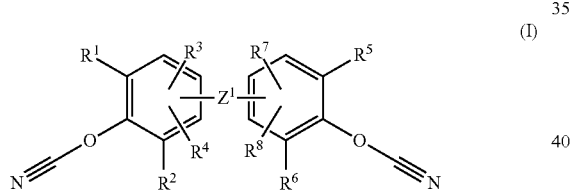

(I)

wherein
$R^1$ through $R^8$ are independently selected from the group consisting of hydrogen, linear $C_{1-3}$ alkyl;
$Z^1$ indicates a direct bond or a divalent moiety selected from the group consisting of —O—, —S—, —S(=O)$_2$—, —CH$_2$—, —CH(CH$_3$)—, —C(CH$_3$)$_2$—, —C(CF$_3$)$_2$—, —C(=CCl$_2$)—, branched $C_{4-6}$ alkanediyl, $C_{3-8}$ cycloalkanediyl, 1,2-phenylene, 1,3-phenylene, 1,4-phenylene; and oligomers, prepolymers, polymers or mixtures thereof;
and
(ii) a polyfunctional cyanate ester of formula (II)

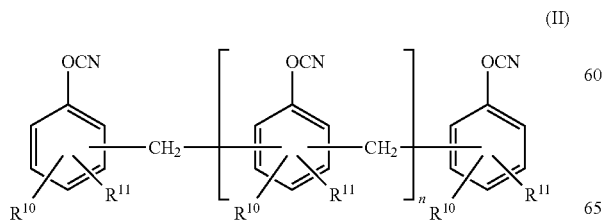

(II)

wherein
n is an integer from 1 to 10; and $R^{10}$ and $R^{11}$ are identical or different and independently from each other selected from the group consisting of hydrogen, linear $C_{1-5}$ alkyl and branched $C_{4-6}$ alkyl, and oligomers, prepolymers, polymers or mixtures thereof.

4. A composition according to claim 1 wherein component (b) is one or more substituted bisimide independently selected from
b1) at least one selected from the group of biscitraconimide compound of formula (X1), bisitaconimide compound of formula (X2) and citraconimido-itaconimide compound of formula (X3),

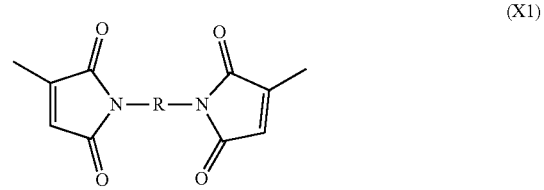

(X1)

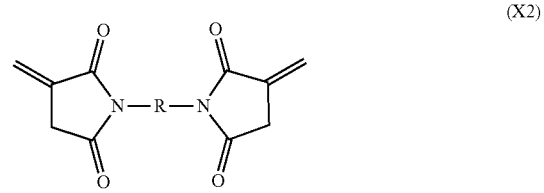

(X2)

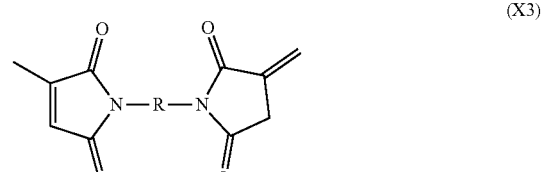

(X3)

or
b2) a bisnadicimide compound of formula (X4) and oligomers, prepolymers, polymers or mixtures thereof,

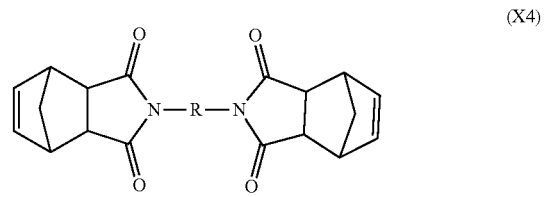

(X4)

or
b3) a bistetrahydroimide compound of formula (X5) and oligomers, prepolymers, polymers or mixtures thereof

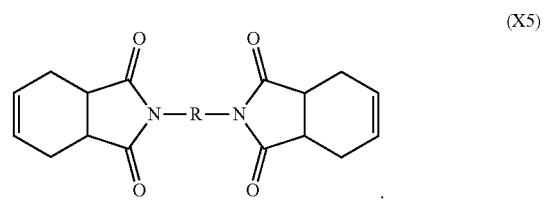

(X5)

5. A composition according to claim 1 wherein component (a) is one or more cyanate esters independently selected from (i) a difunctional cyanate ester compound of formula (I)

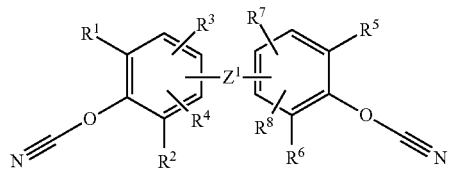

(I)

wherein the difunctional cyanate ester of formula I is independently selected from the group consisting of
(a) $R^1$, $R^2$, $R^5$ and $R^6$ are methyl, $R^3$, $R^4$, $R^7$ and $R^8$ are hydrogen and wherein $Z^1$ is —$CH_2$—(methylene) and oligomers, prepolymers, polymers or mixtures thereof, or
(b) $R^1$ through $R^8$ are hydrogen and $Z^1$ is —$C(CH_3)_2$— and oligomers, prepolymers, polymers or mixtures thereof, or
(c) $R^1$ through $R^8$ are hydrogen and $Z^1$ is —S— and oligomers, prepolymers, polymers or mixtures thereof, or
(d) $R^1$ through $R^8$ are hydrogen and $Z^1$ is —$C(CF_3)_2$— and oligomers, prepolymers, polymers or mixtures thereof, or
(e) $R^1$ through $R^8$ are hydrogen and $Z^1$ is —$C(=CCl_2)$— and oligomers, prepolymers, polymers or mixtures thereof, or
(f) $R^1$ through $R^8$ are hydrogen and $Z^1$ is independently selected from the group consisting of

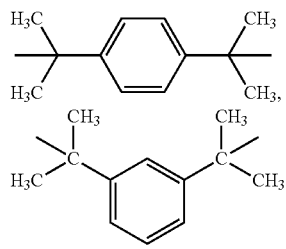

and oligomers, prepolymers, polymers or mixtures thereof, or
(g) $R^1$ through $R^8$ are hydrogen and $Z^1$ is

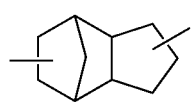

and oligomers, prepolymers, polymers or mixtures thereof, or
(h) $R^1$ through $R^8$ are hydrogen and $Z^1$ is —$CH(CH_3)$— and oligomers, prepolymers, polymers or mixtures thereof,
and oligomers, prepolymers, polymers or mixtures thereof;

and/or
ii) a polyfunctional cyanate ester of formula (II)

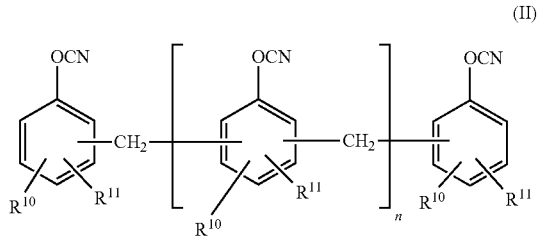

(II)

wherein the polyfunctional cyanate ester is independently selected from the group consisting of compound III of formula

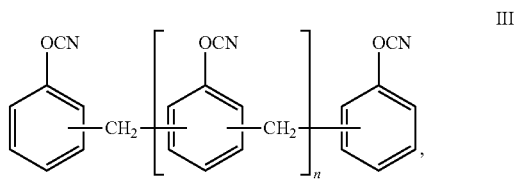

III n is 2 to 3 compound IV of formula

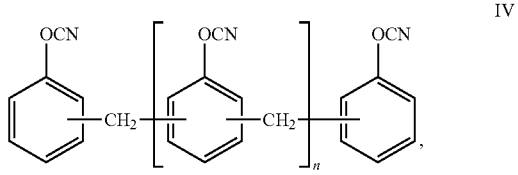

IV n is 3 to 4 compound V of formula

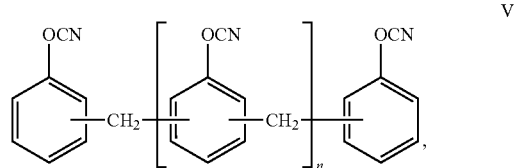

V n is 3 to 6 compound VI of formula

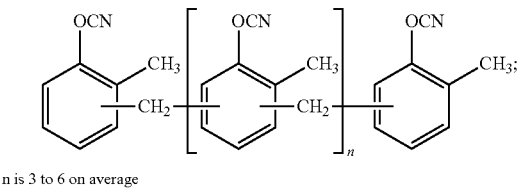

n is 3 to 6 on average and
oligomers, prepolymers, polymers or mixtures thereof.

6. A composition according to claim 1 wherein the ratio of component (a) to (b) is 80 wt % component (a) to 20 wt % component (b) based on total amount of the resin composition.

7. A composition according to claim 1 wherein component (a) is one or more cyanate esters independently selected from
(i) a difunctional cyanate ester compound of formula (I)

(I)

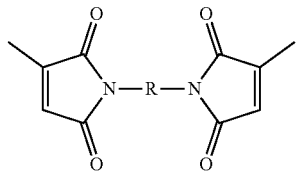

wherein $R^1$ through $R^8$ are hydrogen and $Z^1$ is —CH(CH$_3$)— and oligomers, prepolymers, polymers or mixtures thereof;
and
(ii) a polyfunctional cyanate ester of formula (II)

(II)

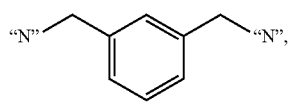

wherein the polyfunctional cyanate ester is independently selected from the group consisting of compound III, compound IV, compound V, and oligomers, prepolymers, polymers or mixtures thereof;

III

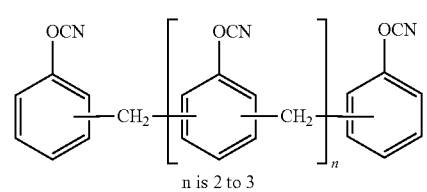

n is 2 to 3

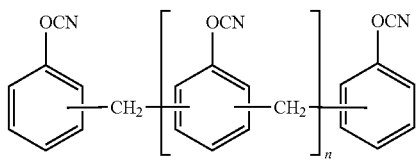

n is 3 to 4

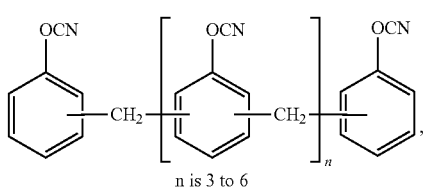

n is 3 to 6 and wherein component (b) is a biscitraconimide compound of formula (X1), (X1)

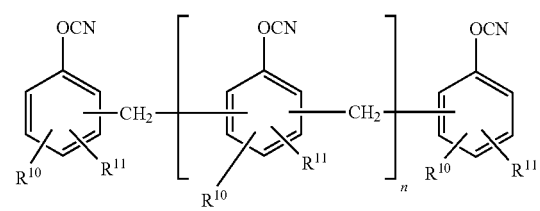

wherein R is

"N"—CH$_2$—[phenyl]—CH$_2$—"N", and "N" corresponds to N in formula (X1),
and oligomers, prepolymers, polymers or mixtures thereof.

8. A method for the preparation of a composition according to claim 1 comprising the steps of:
i) providing a mixture components according to claim 1; and
ii) intimately mixing the components together.

9. A composition according to claim 1 wherein the composition further comprises a catalyst selected from the group consisting of aliphatic mono-, di- and polyamines, aromatic mono-, di- and polyamines, carbocyclic mono-, di and polyamines, heterocyclic mono-, di- and polyamines, compounds containing a five- or six-membered nitrogen-containing heterocyclic ring, hydroxyamines, phosphines, phenols, and mixtures thereof.

10. A composition according to claim 1 wherein the composition further comprises reinforcement fibres selected from the group consisting of carbon fibres, glass fibres, aramid fibres, basalt fibres, natural fibres, fleeces and woven fabrics, and mixtures thereof.

11. A composition according to claim 1 wherein the composition further comprise a filler selected from the group consisting of organic fillers, inorganic fillers, mineral powder fillers, and mixtures thereof.

12. A composition according to claim 1 wherein the composition further comprise a filler selected from the group consisting of thermoplastics, elastomers, silica, CaCO$_3$, coated CaCO$_3$, kaolin clay, talc, graphite, corundum, wollastonite, SiC, glass microspheres, mica, calcium silicate, MgO, anhydrous calcium sulfate, ceramic hollow microspheres, fused mullite, boron nitride, vermiculite, basalt, and mixtures thereof.

13. A method for the preparation of a thermoset composite material comprising the steps of:
   i) providing a mixture components according to claim 1;
   ii) intimately mixing the components together;
   iii) casting the mixture into the desired form; and
   iv) initiating polymerization of the mixture.

14. A method for producing a thermoset composite material comprising a composition as defined in claim 1.

15. A composition comprising components (a) and (b) wherein component (a) is one or more cyanate esters independently selected from
   (i) a difunctional cyanate ester compound of formula (I)

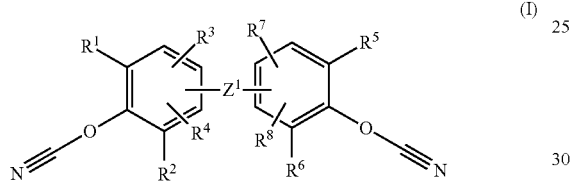

wherein
   $R^1$ through $R^8$ are independently selected from the group consisting of hydrogen, linear $C_{1-10}$ alkyl, halogenated linear $C_{1-10}$ alkyl, branched $C_{4-10}$ alkyl, halogenated branched $C_{4-10}$ alkyl, $C_{3-8}$ cycloalkyl, halogenated $C_{3-8}$ cycloalkyl, $C_{1-10}$ alkoxy, halogen, phenyl and phenoxy;
   $Z^1$ indicates a direct bond or a divalent moiety selected from the group consisting of —O—, —S—, —S(=O)—, —S(=O)$_2$—, —CH$_2$—, —CH(CH$_3$)—, —C(CH$_3$)$_2$—, —CH(CF$_3$)—, —C(CF$_3$)$_2$—, —C(=O)—, —C(=CH$_2$)—, —C(=CCl$_2$)—, —Si(CH$_3$)$_2$—, linear $C_{1-10}$ alkanediyl, branched $C_{4-10}$ alkanediyl, $C_{3-8}$ cycloalkanediyl, 1,2-phenylene, 1,3-phenylene, 1,4-phenylene, —N(R$^{13}$)— wherein $R^{13}$ is selected from the group consisting of hydrogen, linear $C_{1-10}$ alkyl, halogenated linear $C_{1-10}$ alkyl, branched $C_{4-10}$ alkyl, halogenated branched $C_{4-10}$ alkyl, $C_{3-8}$ cycloalkyl, phenyl and phenoxy, and moieties of formulas

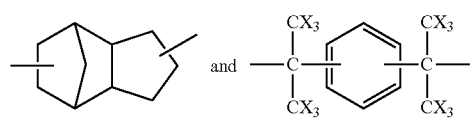

wherein X is independently selected from hydrogen and halogen;
   and oligomers, prepolymers, polymers or mixtures thereof;

and
   (ii) a polyfunctional cyanate ester of formula (II)

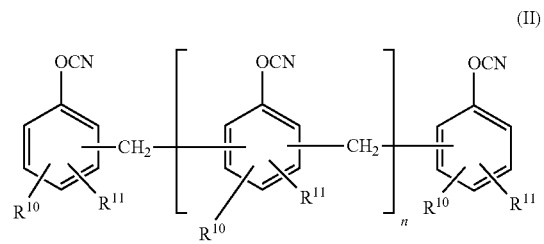

wherein
   n is an integer from 1 to 20; and $R^{10}$ and $R^{11}$ are identical or different and independently from each other selected from the group consisting of hydrogen, linear $C_{1-10}$ alkyl and branched $C_{4-10}$ alkyl;
   and oligomers, prepolymers, polymers or mixtures thereof;
wherein component (b) is one or more substituted bisimide independently selected from
   b1) at least one selected from the group of biscitraconimide compound of formula (X1), bisitaconimide compound of formula (X2) and citraconimido-itaconimide compound of formula (X3),

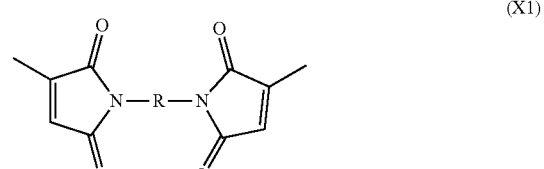

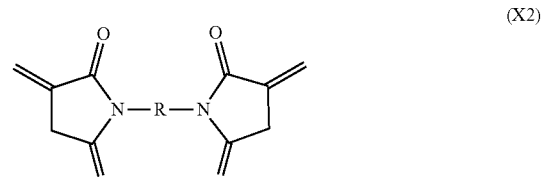

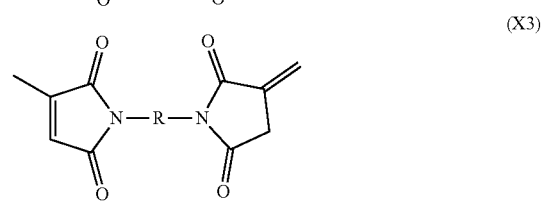

or
   b2) a bisnadicimide compound of formula (X4) and oligomers, prepolymers, polymers or mixtures thereof,

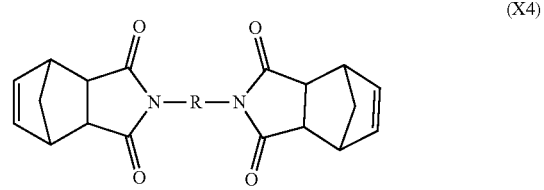

or b3) a bistetrahydroimide compound of formula (X5) and oligomers, prepolymers, polymers or mixtures thereof

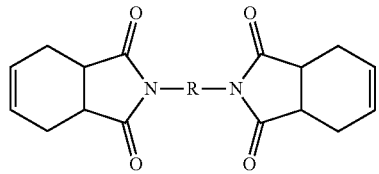
(X5)

wherein R is the moiety << "N"—R—"N">>, wherein "N" denotes the point of connectivity and R is an aromatic amine moiety independently selected from

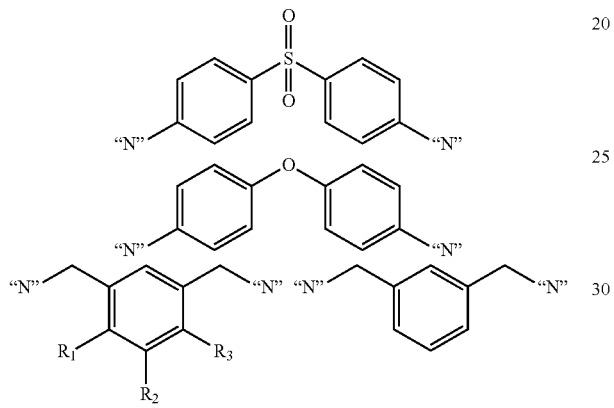

wherein

R$_1$, R$_2$, and R$_3$ are each independently selected from hydrogen, C$_1$-C$_5$ alkyl, halogen, NO$_2$, and sulfone, wherein the halogen is selected from Cl, Br or F;

and oligomers, prepolymers, polymers or mixtures thereof.

16. A composition comprising components (a) and (b) wherein component (a) is one or more cyanate esters independently selected from (i) a difunctional cyanate ester compound of formula (I)

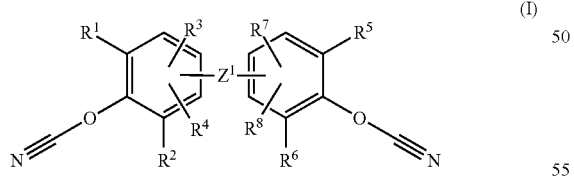
(I)

wherein

R$^1$ through R$^8$ are independently selected from the group consisting of hydrogen, linear C$_{1\text{-}10}$ alkyl, halogenated linear C$_{1\text{-}10}$ alkyl, branched C$_{4\text{-}10}$ alkyl, halogenated branched C$_{4\text{-}10}$ alkyl, C$_{3\text{-}8}$ cycloalkyl, halogenated C$_{3\text{-}8}$ cycloalkyl, C$_{1\text{-}10}$ alkoxy, halogen, phenyl and phenoxy;

Z$^1$ indicates a direct bond or a divalent moiety selected from the group consisting of —O—, —S—, —S(=O)—, —S(=O)$_2$—, —CH$_2$—, —CH(CH$_3$)—, —C(CH$_3$)$_2$—, —CH(CF$_3$)—, —C(CF$_3$)$_2$—, —C(=O)—, —C(=CH$_2$)—, —C(=CCl$_2$)—, —Si(CH$_3$)$_2$—, linear C$_{1\text{-}10}$ alkanediyl, branched C$_{4\text{-}10}$ alkanediyl, C$_{3\text{-}8}$ cycloalkanediyl, 1,2-phenylene, 1,3-phenylene, 1,4-phenylene, —N(R$^{13}$)— wherein R$^{13}$ is selected from the group consisting of hydrogen, linear C$_{1\text{-}10}$ alkyl, halogenated linear C$_{1\text{-}10}$ alkyl, branched C$_{4\text{-}10}$ alkyl, halogenated branched C$_{4\text{-}10}$ alkyl, C$_{3\text{-}8}$ cycloalkyl, phenyl and phenoxy, and moieties of formulas

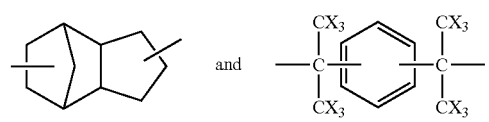

wherein X is independently selected from hydrogen and halogen; and oligomers, prepolymers, polymers or mixtures thereof;

and (ii) a polyfunctional cyanate ester of formula (II)

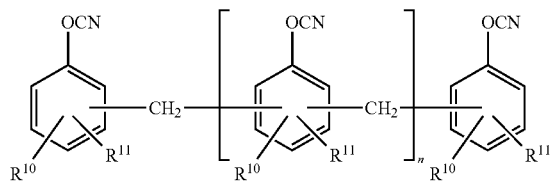
(II)

wherein n is an integer from 1 to 20; and R$^{10}$ and R$^{11}$ are identical or different and independently from each other selected from the group consisting of hydrogen, linear C$_{1\text{-}10}$ alkyl and branched C$_{4\text{-}10}$ alkyl; and oligomers, prepolymers, polymers or mixtures thereof;

and wherein component (b) is one or more substituted bisimide independently selected from b1) at least one selected from the group of biscitraconimide compound of formula (X1), bisitaconimide compound of formula (X2) and citraconimido-itaconimide compound of formula (X3), and oligomers, prepolymers, polymers or mixtures thereof,

(X1)

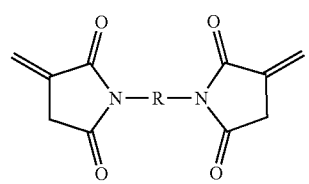
(X2)

(X3)
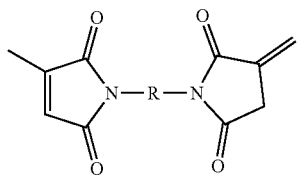
or
b2) a bisnadicimide compound of formula (X4) and oligomers, prepolymers, polymers or mixtures thereof,
(X4)
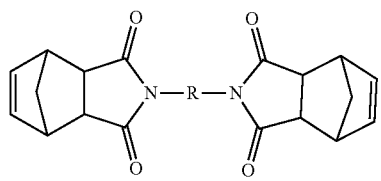
or
b3) a bistetrahydroimide compound of formula (X5) and oligomers, prepolymers, polymers or mixtures thereof,
(X5)
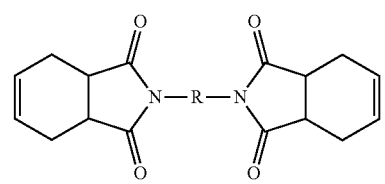
wherein R is o-xylylene; and oligomers, prepolymers, polymers or mixtures thereof.
* * * * *